United States Patent
Henkin et al.

(10) Patent No.: US 8,700,588 B2
(45) Date of Patent: *Apr. 15, 2014

(54) SYSTEM AND METHOD FOR REAL-TIME WEB PAGE ANALYSIS AND MODIFICATION

(75) Inventors: Assaf Henkin, Tel Aviv (IL); Yoav Shaham, Ramat Hasharon (IL); Henit Vitos, San Francisco, CA (US); Benny Friedman, Los Altos, CA (US); Itai Brickner, Tel Aviv (IL)

(73) Assignee: Kontera Technologies, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/910,264

(22) Filed: Oct. 22, 2010

(65) Prior Publication Data

US 2011/0035439 A1 Feb. 10, 2011

Related U.S. Application Data

(63) Continuation of application No. 11/891,436, filed on Aug. 10, 2007, now Pat. No. 7,822,743, which is a continuation of application No. 10/977,352, filed on Oct. 28, 2004, now Pat. No. 7,478,089, said application No. 11/891,436 is a continuation-in-part of application No. 09/943,524, filed on Aug. 29, 2001, now Pat. No. 7,284,008, said application No. 11/891,436 is a continuation-in-part of application No. 09/943,571, filed on Aug. 29, 2001, now Pat. No. 7,451,099.

(60) Provisional application No. 60/515,627, filed on Oct. 29, 2003, provisional application No. 60/311,418, filed on Aug. 9, 2001, provisional application No. 60/229,452, filed on Aug. 30, 2000.

(51) Int. Cl.
*G06F 17/30* (2006.01)

(52) U.S. Cl.
USPC .......................................................... 707/705

(58) Field of Classification Search
USPC .......................................................... 707/705
See application file for complete search history.

(56) References Cited

U.S. PATENT DOCUMENTS 5,603,025 A 2/1997 Tabb et al.
5,636,346 A 6/1997 Saxe (Continued)

FOREIGN PATENT DOCUMENTS

EP 1030247 A2 8/2000
WO WO-99/55066 10/1999

(Continued)

OTHER PUBLICATIONS

"U.S. Appl. No. 11/732,694, Response filed Aug. 3, 2011 to Final Office Action mailed Apr. 28, 2011", 11 pgs.

(Continued)

*Primary Examiner* — Sheree Brown
(74) *Attorney, Agent, or Firm* — Schwegman, Lundberg & Woessner, P.A.

(57) ABSTRACT

A technique is described for delivering contextual information to end users of a data network which includes at least one client system associated with an end user. According to a specific embodiment, the technique of the present invention provides a contextual-based platform for delivering to an end user in real-time proactive, personalized, contextual information relating to web page content currently being displayed to the user.

27 Claims, 14 Drawing Sheets

(56) References Cited

U.S. PATENT DOCUMENTS

| | | |
|---|---|---|
| 5,692,132 A | 11/1997 | Hogan |
| 5,693,132 A | 12/1997 | Kluttz et al. |
| 5,694,594 A | 12/1997 | Chang |
| 5,710,884 A | 1/1998 | Dedrick |
| 5,710,887 A | 1/1998 | Chelliah et al. |
| 5,712,979 A | 1/1998 | Graber et al. |
| 5,717,860 A | 2/1998 | Graber et al. |
| 5,717,923 A | 2/1998 | Dedrick |
| 5,721,827 A | 2/1998 | Logan et al. |
| 5,724,424 A | 3/1998 | Gifford |
| 5,724,521 A | 3/1998 | Dedrick |
| 5,727,156 A | 3/1998 | Herr-Hoyman et al. |
| 5,737,619 A | 4/1998 | Judson |
| 5,740,549 A | 4/1998 | Reilly et al. |
| 5,751,956 A | 5/1998 | Kirsch |
| 5,751,969 A | 5/1998 | Kapoor |
| 5,757,917 A | 5/1998 | Rose et al. |
| 5,764,906 A | 6/1998 | Edelstein et al. |
| 5,774,170 A | 6/1998 | Hite et al. |
| 5,815,830 A | 9/1998 | Anthony |
| 5,822,539 A | 10/1998 | van Hoff |
| 5,826,025 A | 10/1998 | Gramlich |
| 5,848,396 A | 12/1998 | Gerace |
| 5,848,397 A | 12/1998 | Marsh et al. |
| 5,895,461 A | 4/1999 | De La Huerga et al. |
| 5,903,889 A | 5/1999 | De La Huerga |
| 5,933,811 A | 8/1999 | Angles et al. |
| 5,948,061 A | 9/1999 | Merriman et al. |
| 5,959,623 A | 9/1999 | van Hoff et al. |
| 5,995,943 A | 11/1999 | Bull et al. |
| 6,041,311 A | 3/2000 | Chislenko et al. |
| 6,044,376 A | 3/2000 | Kurtzman, II |
| 6,061,659 A | 5/2000 | Murray |
| 6,073,143 A | 6/2000 | Nishikawa et al. |
| 6,081,829 A | 6/2000 | Sidana |
| 6,092,074 A | 7/2000 | Rodkin et al. |
| 6,098,065 A | 8/2000 | Skillen et al. |
| 6,122,647 A | 9/2000 | Horowitz et al. |
| 6,141,010 A | 10/2000 | Hoyle |
| 6,144,944 A * | 11/2000 | Kurtzman et al. ......... 705/14.54 |
| 6,256,631 B1 | 7/2001 | Malcolm |
| 6,266,681 B1 | 7/2001 | Guthrie |
| 6,285,987 B1 | 9/2001 | Roth et al. |
| 6,295,542 B1 | 9/2001 | Corbin |
| 6,311,194 B1 | 10/2001 | Sheth et al. |
| 6,317,781 B1 | 11/2001 | De Boor et al. |
| 6,321,257 B1 | 11/2001 | Kotola et al. |
| 6,334,145 B1 | 12/2001 | Adams et al. |
| 6,421,733 B1 | 7/2002 | Tso et al. |
| 6,434,657 B1 | 8/2002 | Brown |
| 6,507,837 B1 | 1/2003 | De La Huerga |
| 6,516,321 B1 | 2/2003 | De La Huerga |
| 6,578,078 B1 | 6/2003 | Smith et al. |
| 6,581,065 B1 | 6/2003 | Rodkin et al. |
| 6,591,248 B1 | 7/2003 | Nakamura et al. |
| 6,606,652 B1 | 8/2003 | Cohn et al. |
| 6,647,364 B1 | 11/2003 | Yumura et al. |
| 6,725,227 B1 | 4/2004 | Li |
| 6,742,163 B1 | 5/2004 | Ono et al. |
| 6,748,385 B1 | 6/2004 | Rodkin et al. |
| 6,757,661 B1 | 6/2004 | Blaser et al. |
| 6,785,740 B1 | 8/2004 | Yoneda et al. |
| 6,792,430 B1 | 9/2004 | Kenyon et al. |
| 6,848,077 B1 | 1/2005 | McBrearty et al. |
| 6,862,710 B1 | 3/2005 | Marchisio |
| 6,968,332 B1 | 11/2005 | Milic-Frayling et al. |
| 7,110,993 B2 | 9/2006 | Soulanille et al. |
| 7,149,698 B2 | 12/2006 | Guheen et al. |
| 7,165,041 B1 | 1/2007 | Guheen et al. |
| 7,257,585 B2 | 8/2007 | Stevenson et al. |
| 7,284,008 B2 | 10/2007 | Henkin et al. |
| 7,313,588 B1 | 12/2007 | Shotton et al. |
| 7,315,826 B1 | 1/2008 | Guheen et al. |
| 7,437,725 B1 | 10/2008 | Chang et al. |
| 7,451,099 B2 | 11/2008 | Henkin et al. |
| 7,464,381 B1 * | 12/2008 | Nickerson et al. ............ 719/311 |
| 7,478,089 B2 | 1/2009 | Henkin et al. |
| 7,493,553 B1 | 2/2009 | Vora et al. |
| 7,818,319 B2 | 10/2010 | Henkin et al. |
| 7,822,743 B2 | 10/2010 | Henkin et al. |
| 2001/0018704 A1 | 8/2001 | Kikugawa |
| 2002/0035619 A1 | 3/2002 | Dougherty et al. |
| 2002/0035697 A1 | 3/2002 | McCurdy et al. |
| 2002/0052925 A1 | 5/2002 | Kim et al. |
| 2002/0065136 A1 | 5/2002 | Day |
| 2002/0107735 A1 | 8/2002 | Henkin et al. |
| 2002/0111865 A1 | 8/2002 | Middleton |
| 2002/0120505 A1 | 8/2002 | Henkin et al. |
| 2002/0123912 A1 | 9/2002 | Subramanian et al. |
| 2002/0143808 A1 | 10/2002 | Miller et al. |
| 2003/0208472 A1 | 11/2003 | Pham |
| 2003/0208483 A1 | 11/2003 | Satomi et al. |
| 2004/0044571 A1 | 3/2004 | Bronnimann et al. |
| 2004/0059708 A1 | 3/2004 | Dean et al. |
| 2004/0073568 A1 | 4/2004 | Yonaha |
| 2004/0083211 A1 | 4/2004 | Bradford |
| 2004/0093327 A1 | 5/2004 | Anderson et al. |
| 2005/0004909 A1 | 1/2005 | Stevenson et al. |
| 2005/0033641 A1 | 2/2005 | Jha et al. |
| 2005/0137939 A1 | 6/2005 | Calabria et al. |
| 2005/0149395 A1 | 7/2005 | Henkin et al. |
| 2006/0293951 A1 | 12/2006 | Patel et al. |
| 2007/0118803 A1 | 5/2007 | Walker et al. |
| 2008/0016059 A1 | 1/2008 | Henkin et al. |
| 2008/0016109 A1 | 1/2008 | Henkin et al. |
| 2008/0046415 A1 | 2/2008 | Henkin et al. |
| 2008/0114755 A1 | 5/2008 | Wolters et al. |
| 2008/0228675 A1 | 9/2008 | Duffy et al. |
| 2008/0250060 A1 | 10/2008 | Grois |
| 2009/0012869 A1 | 1/2009 | Henkin et al. |
| 2009/0031311 A1 | 1/2009 | Chang et al. |
| 2009/0048978 A1 | 2/2009 | Ginter et al. |
| 2009/0164949 A1 | 6/2009 | Henkin et al. |
| 2009/0254971 A1 | 10/2009 | Herz et al. |
| 2010/0138271 A1 | 6/2010 | Henkin et al. |
| 2010/0138451 A1 | 6/2010 | Henkin et al. |
| 2010/0138452 A1 | 6/2010 | Henkin et al. |
| 2010/0174607 A1 | 7/2010 | Henkin et al. |
| 2011/0035438 A1 | 2/2011 | Henkin et al. |
| 2011/0035440 A1 | 2/2011 | Henkin et al. |
| 2011/0213655 A1 | 9/2011 | Henkin et al. |

FOREIGN PATENT DOCUMENTS

| | | |
|---|---|---|
| WO | WO-01/86390 A2 | 11/2001 |
| WO | WO-02/19175 A2 | 3/2002 |
| WO | WO-2005/003920 A2 | 1/2005 |
| WO | WO-2005025252 A2 | 3/2005 |
| WO | WO-2005094098 A1 | 10/2005 |
| WO | WO-2007/123783 A2 | 11/2007 |
| WO | WO-2007/123783 A3 | 11/2007 |
| WO | WO-2010/085773 A1 | 7/2010 |

OTHER PUBLICATIONS

"U.S. Appl. No. 11/732,694, Advisory Action mailed Jul. 21, 2011", 3 pgs.

"U.S. Appl. No. 11/732,694, Final Office Action mailed Apr. 28, 2011", 26 pgs.

"U.S. Appl. No. 11/732,694, Response filed May 23, 2011 to Final Office Action mailed Apr. 28, 2011", 13 pgs.

"U.S. Appl. No. 11/732,694, Response filed Feb. 16, 2011 to Non Final Office Action mailed Sep. 16, 2010", 13 pgs.

"U.S. Appl. No. 11/891,435, Final Office Action mailed Aug. 19, 2011", 21 pgs.

"U.S. Appl. No. 11/891,435, Non Final Office Action mailed Feb. 22, 2011", 14 pgs.

"U.S. Appl. No. 11/891,435, Response filed May 23, 2011 to Non Final Office Action mailed Feb. 22, 2011", 11 pgs.

"U.S. Appl. No. 11/891,437, Final Office Action mailed Aug. 19, 2011", 23 pgs.

"U.S. Appl. No. 11/891,437, Non Final Office Action mailed Feb. 23, 2011", 10 pgs.

(56) References Cited

OTHER PUBLICATIONS

"U.S. Appl. No. 11/891,437, Response filed May 23, 2011 to Non Final Office Action mailed Feb. 23, 2011", 7 pgs.
"U.S. Appl. No. 12/212,512, Non Final Office Action mailed May 3, 2011", 14 pgs.
"U.S. Appl. No. 12/212,512, Response filed Feb. 24, 2011 to Non Final Office Action mailed Oct. 1, 2010", 11 pgs.
"U.S. Appl. No. 12/340,464, Non Final Office Action mailed Mar. 31, 2011", 8 pgs.
"International Application Serial No. PCT/US2010/022021, International Preliminary Report on Patentability mailed Aug. 4, 2011", 7 pgs.
"International Application Serial No. PCT/US2010/022021, International Search Report and Written Opinion mailed Mar. 9, 2010", Search Report was taken from PAIR., (Jul. 29, 2010), 3 pages.
"U.S. Appl. No. 11/891,435, Response filed Feb. 21, 2012 to Final Office Action mailed Aug. 19, 2011", 11 pgs.
"U.S. Appl. No. 11/891,437, Response filed Feb. 21, 2012 to Final Office Action mailed Aug. 9, 2011", 9 pgs.
"U.S. Appl. No. 12/212,512, Response filed Nov. 3, 2011 to Non Final Office Action mailed May 3, 2011", 12 pgs.
"U.S. Appl. No. 12/212,512, Final Office Action mailed Dec. 5, 2011", 20 pgs.
"U.S. Appl. No. 12/340,464, Response filed Aug. 31, 2011 to Non Final Office Action mailed Mar. 31, 2011", 6 pgs.
"U.S. Appl. No. 12/340,464, Non Final Office Action mailed Oct. 31, 2011", 9 pgs.
"Application U.S. Appl. No. 12/693,433, Non Final Office Action mailed Feb 27, 2012", 37 pgs.
"U.S. Appl. No. 12/907,183, Non Final Office Action mailed Mar. 8, 2012", 22 pgs.
"U.S. Appl. No. 12/910,337, Non Final Office Action mailed Mar. 8, 2012", 13 pgs.
Dougherty, C. D., et al., "Specification of U.S. Appl. No. 09/631,439, filed Aug. 2, 2000", 1-59.
"U.S. Appl. No. 09/542,496, Non-Final Office Action mailed Jul. 9, 2002", 13 pgs.
"U.S. Appl. No. 11/891,435 Response filed Feb. 18, 2011 to Restriction Requirement mailed Sep. 16, 2010", 5 pgs.
"U.S. Appl. No. 11/891,437 Response filed Jan. 18, 2011 to Restriction Requirement mailed Sep. 16, 2010", 4 pgs.
"U.S. Appl. No. 12/295,854, Response filed Mar. 11, 2013 to Restriction Requirement mailed Sep. 10, 2012", 11 pgs.
"U.S. Appl. No. 12/295,854, Restriction Requirement mailed Sep. 10, 2012", 6 pgs.
"U.S. Appl. No. 12/693,433, Final Office Action mailed Nov. 9, 2012", 34 pgs.
"U.S. Appl. No. 12/693,433, Preliminary Amendment filed Jan. 27, 2011", 12 pgs.
"U.S. Appl. No. 12/693,433, Response filed Aug. 27, 2012 to Non Final Office Action mailed Feb. 27, 2012", 14 pgs.
"U.S. Appl. No. 12/907,183, Examiner Interview Summary mailed Mar. 5, 2013", 3 pgs.
"U.S. Appl. No. 12/907,183, Final Office Action mailed Oct. 17, 2012", 25 pgs.
"U.S. Appl. No. 12/907,183, Preliminary Amendment Filed Oct. 19, 2010", 5 pgs.
"U.S. Appl. No. 12/907,183, Response filed Aug. 8, 2012 to Non Final Office Action mailed Mar. 8, 2012", 10 pgs.
"U.S. Appl. No. 12/907,183, Supplemental Preliminary Amendment Filed Feb. 4, 2011", 8 pgs.
"U.S. Appl. No. 12/910,337, Examiner Interview Summary mailed Mar. 5, 2013", 3 pgs.
"U.S. Appl. No. 12/910,337, Final Office Action mailed Oct. 18, 2012", 15 pgs.
"U.S. Appl. No. 12/910,337, Preliminary Amendment filed Oct. 22, 2010", 5 pgs.
"U.S. Appl. No. 12/910,337, Response filed Aug. 8, 2012 to Non Final Office Action mailed Mar. 8, 2012", 10 pgs.

"U.S. Appl. No. 12/910,337, Supplemental Preliminary Amendment filed Feb. 4, 2011", 8 pgs.
"European Application Serial No. 07754552.3, Extended European Search Report mailed Dec. 14, 2012", 5 pgs.
"European Application Serial No. 07754552.3, Office Action mailed Jan. 2, 2013", 1 pg.
"U.S. Appl. No. 11/732,694 Non-Final Office Action mailed Sep. 16, 2010", 26 pgs.
"U.S. Appl. No. 09/943,524, Amendment A filed Jan. 18, 2005", 17 pgs.
"U.S. Appl. No. 09/943,524, Amendment B filed Aug. 10, 2005", 16 pgs.
"U.S. Appl. No. 09/943,524, Amendment C filed Feb. 14, 2006", 22 pgs.
"U.S. Appl. No. 09/943,524, Amendment D filed Aug. 22, 2006", 6 pgs.
"U.S. Appl. No. 09/943,524, Final Office Action mailed May 2, 2006", 22 pgs.
"U.S. Appl. No. 09/943,524, Final Office Action mailed May 13, 2005", 16 pgs.
"U.S. Appl. No. 09/943,524, Interview Summary dated Feb. 2, 2006", 2 pgs.
"U.S. Appl. No. 09/943,524, Interview Summary dated Oct. 13, 2006", 3 pgs.
"U.S. Appl. No. 09/943,524, Interview Summary mailed Jan. 19, 2005", 1 pg.
"U.S. Appl. No. 09/943,524, Interview Summary mailed Jul. 7, 2005", 1 pg.
"U.S. Appl. No. 09/943,524, Non-Final Office Action mailed Aug. 23, 2004", 14 pgs.
"U.S. Appl. No. 09/943,524, Non-Final Office Action mailed Nov. 21, 2005", 18 pgs.
"U.S. Appl. No. 09/943,524, Notice of Allowance mailed Jul. 25, 2007", 5 pgs.
"U.S. Appl. No. 09/943,524, Office Action mailed Aug. 23, 2004".
"U.S. Appl. No. 09/943,524, Supplemental Amendment filed Oct. 12, 2006", 29 pgs.
"U.S. Appl. No. 09/943,571, Amendment filed Apr. 15, 2008 in response to Non-Final Office Action mailed Oct. 15, 2007", 23 pgs.
"U.S. Appl. No. 09/943,571, Interview Summary mailed May 9, 2008", 3 pgs.
"U.S. Appl. No. 09/943,571, Interview Summary mailed Aug. 11, 2008", 5 pgs.
"U.S. Appl. No. 09/943,571, Non-Final Office Action mailed Oct. 15, 2007", 10 pgs.
"U.S. Appl. No. 09/943,571, Notice of Allowance mailed Aug. 21, 2008", 8 pgs.
"U.S. Appl. No. 09/943,571, Preliminary Amendment filed Mar. 19, 2007", 7 pgs.
"U.S. Appl. No. 09/943,571, Response to Examiner's Proviisional Oviousness-Type Double Patenting Rejection, mailed Aug. 12, 2008", Re Double patenting rejection, Re Double Patenting Rejection, 4 pgs.
"U.S. Appl. No. 09/943,571, Response to Restriction Requirement, filed Aug. 30, 2007", 6 pgs.
"U.S. Appl. No. 09/943,571, Restriction Requirement mailed Jan. 25, 2007", 1 pg.
"U.S. Appl. No. 10/977,352, Amendment filed Jul. 25, 2008 to Final Office Action mailed Feb. 5, 2008", 13 pgs.
"U.S. Appl. No. 10/977,352, Amendment filed Nov. 8, 2007 to Non-Final Office Action mailed May 11, 2007", 13 pgs.
"U.S. Appl. No. 10/977,352, Final Office Action mailed Feb. 5, 2008", 12 pgs.
"U.S. Appl. No. 10/977,352, Interview Summary (allowed claims) mailed Sep. 18, 2008", Re allowed claims, 15 pgs.
"U.S. Appl. No. 10/977,352, Non-Final Office Action mailed May 11, 2007", 13 pgs.
"U.S. Appl. No. 10/977,352, Notice of Allowance mailed Sep. 29, 2008", 19 pgs.
"U.S. Appl. No. 10/977,352, Office Action mailed May 11, 2007".
"U.S. Appl. No. 11/732,694, Response to Restriction Requirement, filed Aug. 24, 2010".

(56) References Cited

OTHER PUBLICATIONS

"U.S. Appl. No. 11/732,694, Restriction Requirement mailed Jun. 24, 2010", 7 pgs.
"U.S. Appl. No. 11/881,430, Amendment B fled Nov. 30, 2006", 23 pgs.
"U.S. Appl. No. 11/881,430, Final Office Action mailed Feb. 18, 2010", 6 pgs.
"U.S. Appl. No. 11/881,430, Non-Final Office Action mailed May 29, 2009", 10 pgs.
"U.S. Appl. No. 11/881,430, Notice of Allowance mailed Jun. 1, 2010", 7 pgs.
"U.S. Appl. No. 11/881,430, Preliminary Amendment (Amendment A) filed Oct. 2, 2007", 5 pgs.
"U.S. Appl. No. 11/881,430, Response filed Apr. 14, 2010 to Final Office Action mailed Feb. 18, 2010", 9 pgs.
"U.S. Appl. No. 11/891,435 Restriction Requirement mailed Sep. 16, 2010", 7 pgs.
"U.S. Appl. No. 11/891,436, Amendment A filed Nov. 26, 2009 to Non-Final Office Action mailed May 27, 2009", 21 pgs.
"U.S. Appl. No. 11/891,436, Final Office Action mailed Mar. 19, 2010", 6 pgs.
"U.S. Appl. No. 11/891,436, Non-Final Office Action mailed May 27, 2009", 10 pgs.
"U.S. Appl. No. 11/891,436, Notice of Allowance mailed Jun. 18, 2010", 8 Pgs.
"U.S. Appl. No. 11/891,436, Response Filed May 19, 2010 to Final Office Action mailed Mar. 19, 2010", 14 pgs.
"U.S. Appl. No. 11/891,437 Restriction Requirement mailed Sep. 16, 2010", 7 pgs.
"U.S. Appl. No. 11/891,578, Amendment B, filed May 30, 2009", 17 pgs.
"U.S. Appl. No. 11/891,578, Final Office Action mailed Feb. 18, 2010", 5 pgs.
"U.S. Appl. No. 11/891,578, Non Final Office Action mailed May 29, 2009", 10 pgs.
"U.S. Appl. No. 11/891,578, Notice of Allowance mailed Jun. 1, 2010", 7 pgs.
"U.S. Appl. No. 11/891,578, Preliminary Amendment filed Oct. 2, 2007", 1 pg.
"U.S. Appl. No. 11/891,578, Response filed Apr. 14, 2010 to Final Office Action mailed Feb. 18, 2010", 11 pgs.
"U.S. Appl. No. 12/295,854, Preliminary Amendment filed Oct. 2, 2008", 3 pgs.
"U.S. Appl. No. 12/212,512 Non-Final Office Action mailed Oct. 1, 2010", 5 pgs.
"International Application Serial No. PCT/US2007/008042, International Search Report and Written Opinion mailed Sep. 19, 2008", 11 pgs.
Baldwin, Paul, "Feed the information bug with Flyswat", [Online] http://articles.techrepublic.com.com/5100-10878_11-5032179.html, (Published on Feb. 22, 2000 and accessed on Apr. 5, 2010), 6 pgs.
Catherine Marshall, et al., "Spatial Hypertext: Designing for Change", ACM, (Aug. 1995), 88-97.
Challenger, Jim, et al., ""A scalable and highly available system for serving dynamic data at frequently accessed web sites"", ACM, (Nov. 1998), 1-30 pages.
Kobayashi, Mei, et al., ""Information Retrieval on the Web"", ACM, (Jun. 2000,), 144-173 pages.
Lemay, Laura, "Teach Yourself Web Publishing with HTML 4 in 14 Days", Sams.net Publishing, Second Professional Referenced Edition, (1997), 637-651.

\* cited by examiner

Fig. 11 ⤹ 1100

| Keyword ID | Text String | Total Clicks | Total Impressions | Type of Impression | Timestamp Info |
|---|---|---|---|---|---|
| 1101 | 1102 | 1103 | 1104 | 1105 | 1106 |

Fig. 12 ⤹ 1200

| Keyword ID | Text String | Keyword Type | Positive/ Negative Characteristic | Rank Info | Super Topic ID | Topic ID | Sub Topic ID | Other |
|---|---|---|---|---|---|---|---|---|
| 1201 | 1202 | 1203 | 1204 | 1205 | 1206 | 1207 | 1208 | 1220 |

Fig. 13 ⤹ 1300

| Title | Description | Landing URL | Click URL | CPC Info |
|---|---|---|---|---|
| 1301 | 1302 | 1303 | 1304 | 1305 |

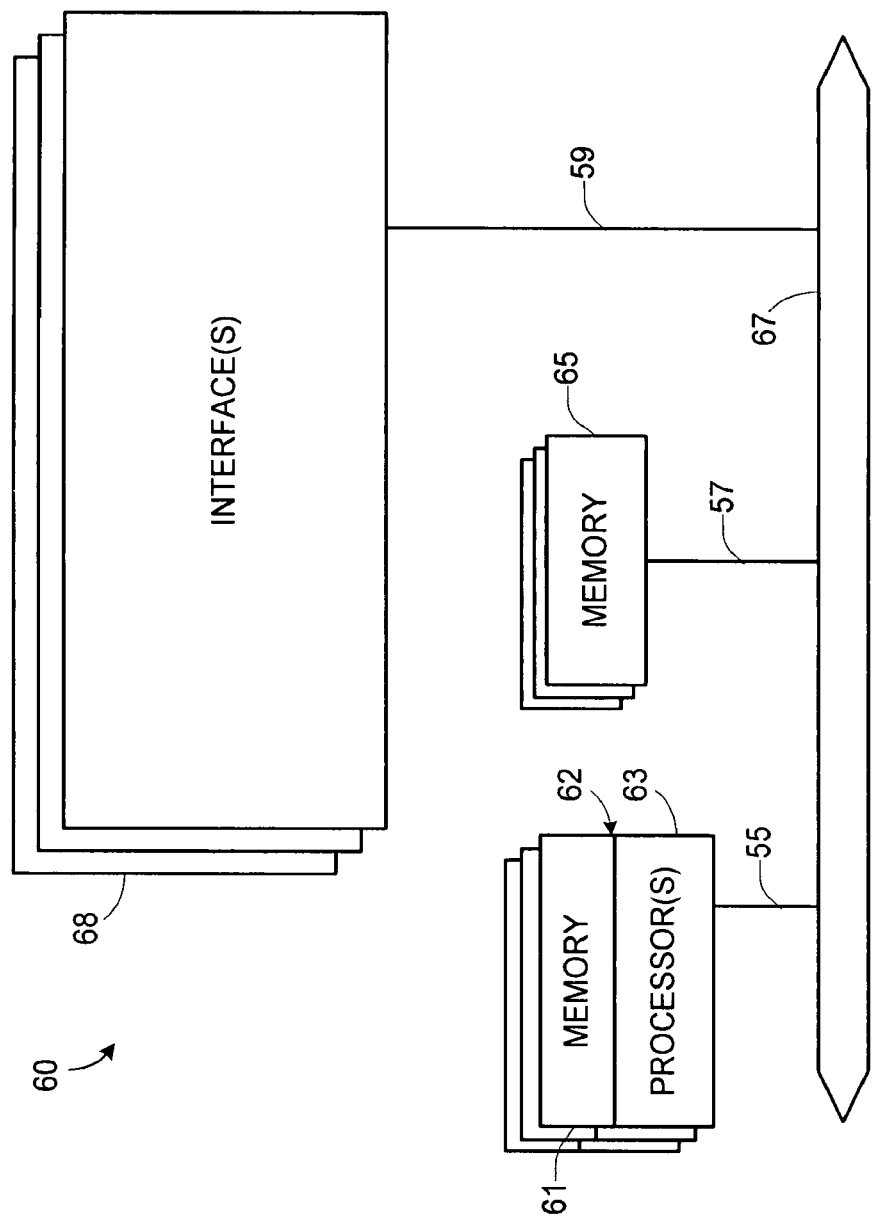

SYSTEM AND METHOD FOR REAL-TIME WEB PAGE ANALYSIS AND MODIFICATION

RELATED APPLICATION DATA

This application is a continuation of, and claims priority under 35 U.S.C. §120 to U.S. patent application Ser. No. 11/891,436, filed Aug. 10, 2007, entitled "SYSTEM AND METHOD FOR REAL-TIME WEB PAGE CONTEXT ANALYSIS FOR THE REAL-TIME INSERTION OF TEXTUAL MARKUP OBJECTS AND DYNAMIC CONTENT," which claims priority benefit under 35 U.S.C. §120 to prior U.S. patent application Ser. No. 10/977,352 entitled "SYSTEM AND METHOD FOR REAL-TIME WEB PAGE CONTEXT ANALYSIS FOR THE REAL-TIME INSERTION OF TEXTUAL MARKUP OBJECTS AND DYNAMIC CONTENT," by Henkin et al., filed on Oct. 28, 2004, which claims benefit under 35 U.S.C. §119 to U.S. Provisional Application Ser. No. 60/515,627, naming Henkin et al. as inventors, and filed Oct. 29, 2003. Each of these applications is incorporated herein by reference in its entirety for all purposes.

U.S. patent application Ser. No. 11/891,436, filed Aug. 10, 2007, entitled "SYSTEM AND METHOD FOR REAL-TIME WEB PAGE CONTEXT ANALYSIS FOR THE REAL-TIME INSERTION OF TEXTUAL MARKUP OBJECTS AND DYNAMIC CONTENT," is also a continuation-in-part application of, and claims priority under 35 U.S.C. §120 to U.S. application Ser. No. 09/943,524, "DYNAMIC DOCUMENT CONTEXT MARK-UP TECHNIQUE IMPLEMENTED OVER A COMPUTER NETWORK", naming Henkin et al. as inventors, and filed Aug. 29, 2001, which claims benefit under 35 U.S.C. §119 to U.S. Provisional Application Ser. No. 60/311,418, "METHOD AND SYSTEM FOR ON-LINE BUSINESSES, INCLUDING BUT NOT LIMITED TO INTERNET SERVICE PROVIDERS TO ANALYZE PAGE CONTEXT ALL OVER THE WEB ON REAL TIME AND IN REAL TIME MARK-UP TEXTUAL OBJECTS ON THE PAGE AND DELIVER DYNAMIC OFFERS IN REAL TIME", naming Henkin et al. as inventors, and filed Aug. 9, 2001, and which claims benefit under 35 U.S.C. §119 to U.S. Provisional Application Ser. No. 60/229,452, "METHOD AND SYSTEM FOR ON-LINE BUSINESSES, INCLUDING BUT NOT LIMITED TO INTERNET SERVICE PROVIDERS TO ANALYZE PAGE CONTEXT ALL OVER THE WEB ON REAL TIME AND IN REAL TIME MARK-UP TEXTUAL OBJECTS ON THE PAGE AND DELIVER DYNAMIC OFFERS IN REAL TIME" naming Henkin et al. as inventors, and filed Aug. 30, 2000. Each of these applications is incorporated herein by reference in its entirety for all purposes.

U.S. patent application Ser. No. 11/891,436, filed Aug. 10, 2007, entitled "SYSTEM AND METHOD FOR REAL-TIME WEB PAGE CONTEXT ANALYSIS FOR THE REAL-TIME INSERTION OF TEXTUAL MARKUP OBJECTS AND DYNAMIC CONTENT," is also a continuation-in-part application of, and claims priority under 35 U.S.C. §120 to prior U.S. patent application Ser. No. 09/943,571 entitled "DYNAMIC DOCUMENT CONTEXT MARK-UP TECHNIQUE IMPLEMENTED OVER A COMPUTER NETWORK," the entirety of which is incorporated herein by reference for all purposes.

BACKGROUND OF THE INVENTION

Over the past decade the Internet has rapidly become an important source of information for individuals and businesses. The popularity of the Internet as an information source is due, in part, to the vast amount of available information that can be downloaded by almost anyone having access to a computer and a modem. Moreover, the internet is especially conducive to conduct electronic commerce, and has already proven to provide substantial benefits to both businesses and consumers.

Many web services have been developed through which vendors can advertise and sell products directly to potential clients who access their websites. To attract potential consumers to their websites, however, like any other business, requires target advertising. One of the most common and conventional advertising techniques applied on the Internet is to provide advertising promotions (e.g., banner ads, pop-ups, ad links) on the web page of another website which directs the end user to the advertiser's site when the advertising promotion is selected by the end user. Typically, the advertiser selects websites which provide context or services related to the advertiser's business.

Conventionally, the process of adding contextual advertising promotions to web page content is both resource intensive and time intensive. In recent years the process has been somewhat automated by utilizing software applications such as application servers, ad servers, code editors, etc. Despite such advances, however, the fact remains that conventional contextual advertising techniques typically require substantial investments in qualified personnel, software applications, hardware, and time.

Furthermore, conventional on-line marketing and advertising techniques are often limited in their ability to provide contextually relevant material for different types of web pages. One reason for this is due to the fact that conventional on-line advertising techniques typically rely upon non-real time analysis of web page content (e.g., from cashed versions of static web pages) to make determinations as to which advertising promotions will be contextually relevant to each web page. However, user customizable web pages, password protected web pages, and real-time dynamically generated web pages are examples of other types of web pages for which it is difficult or impossible to access or predict the content of such pages. The problem intensifies when dealing with sites in which the web page content is continuously changing over time such as, for example, news sites.

Accordingly, it will be appreciated that there exists a need for improving on-line contextual advertising techniques in order to utilize real-time analysis of web page content for identifying advertising promotions that are contextually relevant to such content.

SUMMARY OF THE INVENTION

Various aspects of the present invention are directed to methods, systems, and computer program products for delivering contextual information to end users of a data network which includes at least one client system associated with an end user. A portion of web page content relating to a web page intended for display on the client system is received. According to a specific embodiment, the web page may be associated with a URL which is associated with a content provider. The portion of web page content is analyzed for keyword information. A portion of keyword information associated with the portion of web page content is identified. According to a specific embodiment, the portion of keyword information includes at least one keyword. Contextual information to be delivered to the end user is selected using the portion of keyword information. According to a specific embodiment, the contextual information may include ad information which is provided by a campaign provider server system. A set of web page modification instructions may be generated using the contextual information. According to a specific embodiment, the set of web page modification instructions may include instructions for modifying the web page content to include the selected contextual information. The set of web page modification instructions may be provided to the client system to thereby cause the portion of contextual information to be delivered to the user. According to a specific embodiment, when the client system implements the web page modification instructions, the web page content may be caused to be modified in a manner which results in a display of contextual information on the client system. According to a specific embodiment, the portion of web page content may be analyzed for dynamic keyword information based on language, grammar and/or part-of-speech rules. Keywords relating to the portion of web page content may then be automatically and dynamically generated based upon the dynamic keyword information analysis.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 11 shows an example of a dynamic feedback database record 1100 in accordance with a specific embodiment of the present invention.

FIG. 12 shows an example of a keyword taxonomy database record 1200 in accordance with a specific embodiment of the present invention.

FIG. 13 shows an example of a contextual ad information record 1300 in accordance with a specific embodiment of the present invention.

FIG. 15 shows a network device 60 suitable for implementing the contextual information delivery techniques of the present invention.

DETAILED DESCRIPTION OF THE PREFERRED EMBODIMENTS

The present invention relates to a technique for real-time web page context analysis and real-time insertion of textual markup objects and dynamic content. According to a specific embodiment, the technique of the present invention may be used for enabling advertisers to provide contextual advertising promotions to end-users based upon real-time analysis of web page content that is being served to the end-user's computer system. In at least one embodiment, the information obtained from the real-time analysis may be used to select, in real-time, contextually relevant information, advertisements, and/or other content which may then be displayed to the end-user, for example, via real-time insertion of textual markup objects and/or dynamic content.

According to different embodiment of the present invention, a variety of different techniques may be used for displaying the textual markup information and/or dynamic content information to the end-user. As described in greater detail below, such techniques may include, for example, placing additional links to information (e.g., content, marketing opportunities, promotions, graphics, commerce opportunities, etc.) within the existing text of the web page content by transforming existing text into hyperlinks (herein referred to as "AdLinks"); placing additional relevant search listings or search ads next to the relevant web page content (herein referred to as "TextMatch"); placing relevant marketing opportunities, promotions, graphics, commerce opportunities, etc. next to the web page content (herein referred to as "AdMatch"); placing relevant content, marketing opportunities, promotions, graphics, commerce opportunities, etc. on top or under the current page (herein referred to as "Contextual Pop-ups"); finding pages that relate to each other (e.g., by relevant topic or theme), then finding relevant keywords on those pages, and then transforming those relevant keywords into hyperlinks that link between the related pages (herein referred to as "NaviLinks").

Figure 1:
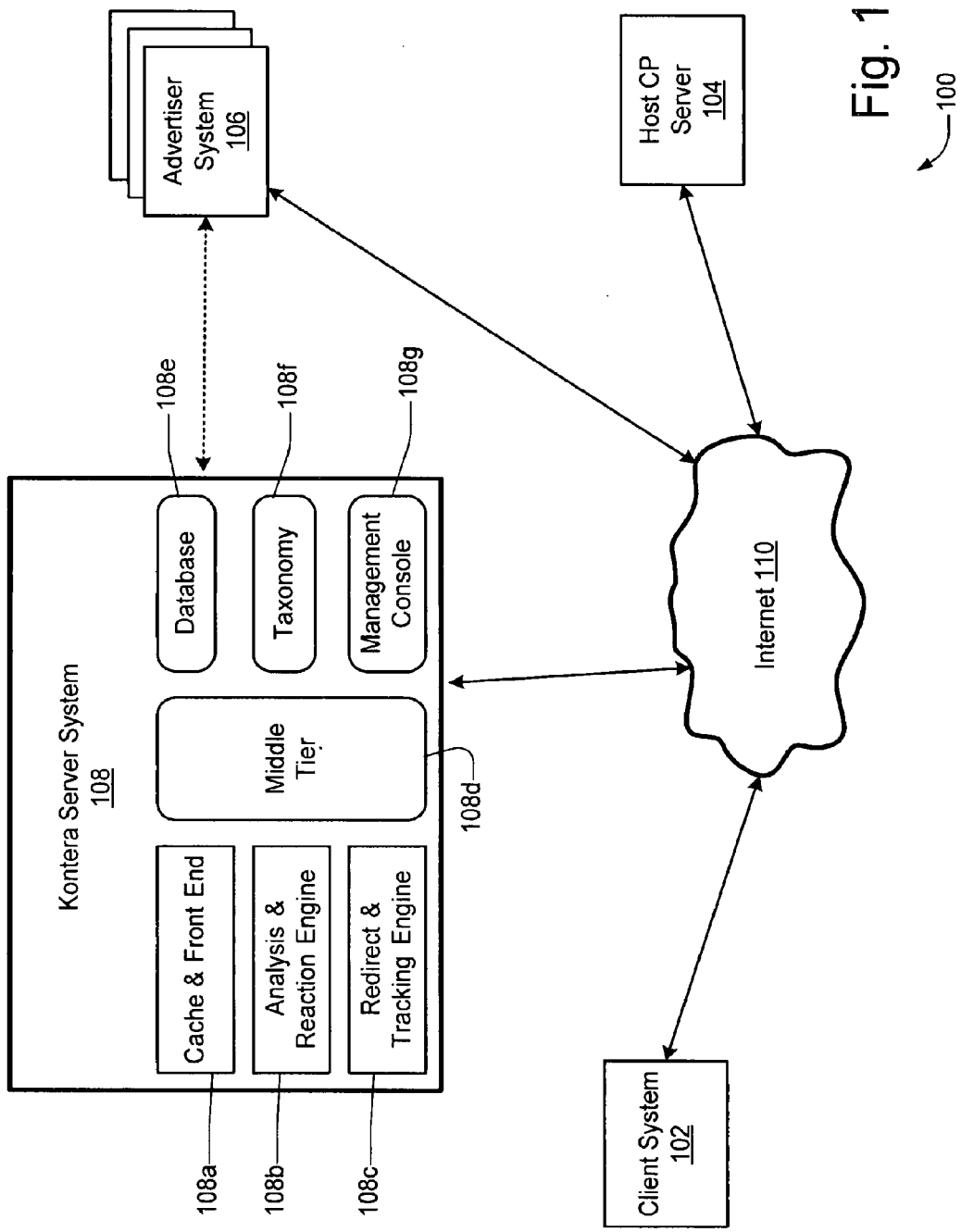
FIG. 1 shows a block diagram of a computer network portion 100 which may be used for implementing various aspects of the present invention in accordance with a specific embodiment.

FIG. 1 shows a block diagram of a computer network portion 100 which may be used for implementing various aspects of the present invention in accordance with a specific embodiment. As illustrated in FIG. 1, network portion 100 includes at least one client system 102, at least one host server or content provider (CP) server 104, at least one advertiser system 106, and at least one contextual analysis and response server (herein referred to as "Kontera Server System" or "KON Server") 108. It at least one embodiment, the Kontera Server System 108 may be configured or designed to implement various aspects of the present invention including, for example, real-time web page context analysis and/or real-time insertion of textual markup objects and dynamic content. In the example of FIG. 1, the Kontera Server System 108 is shown to include a variety of components, including, for example, a Cache & Front End component 108a, an Analysis & Reaction Engine 108b, a Redirect & Tracking Engine 108c, a Middle Tier component 108d, a database 108e, a Taxonomy component 108f, a Management Console 108g, etc. A number of these components are described in greater detail with respect to FIG. 2 of the drawings.

Figure 2:
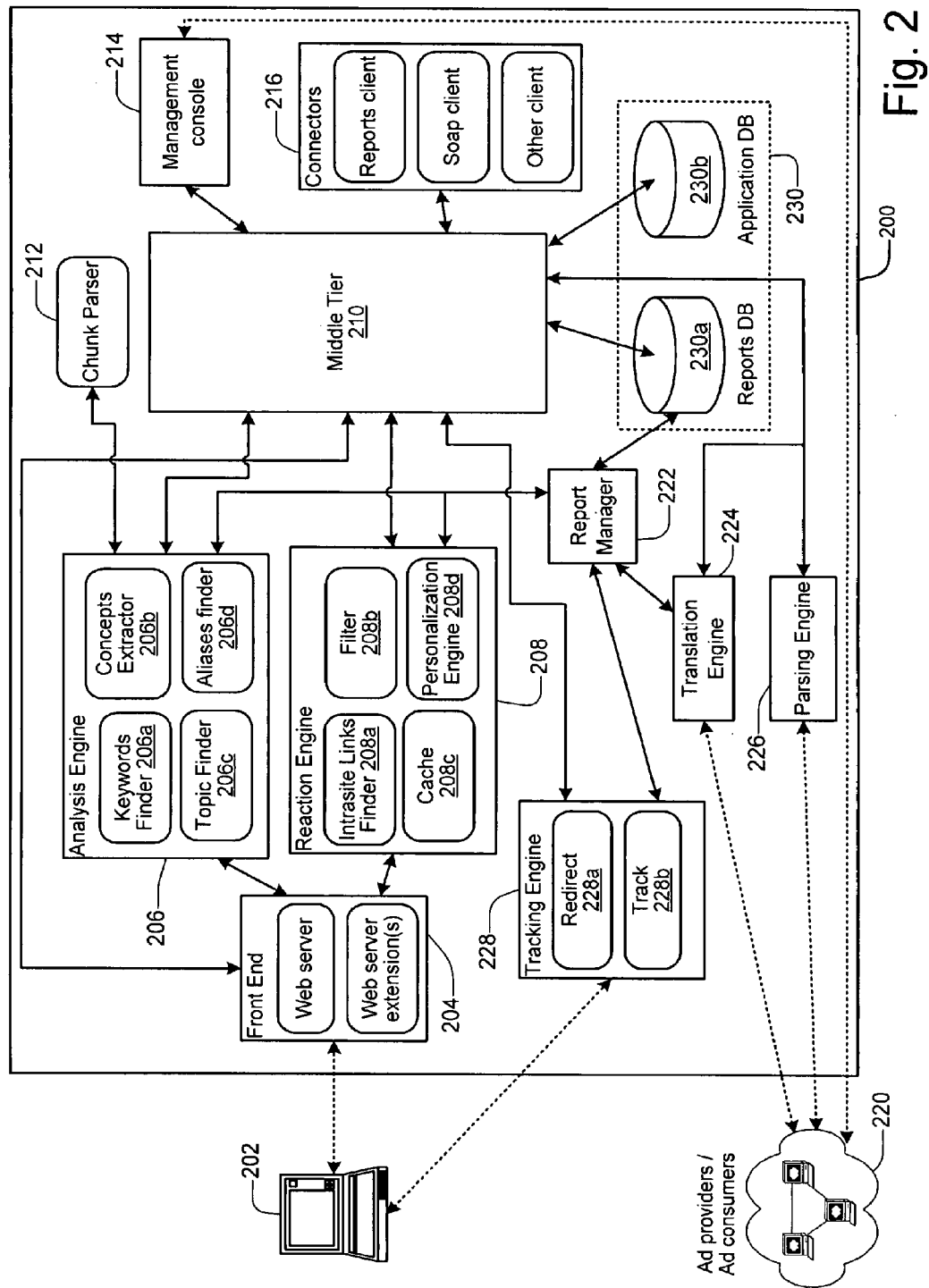
FIG. 2 shows a block diagram of various components and systems of the Kontera Server System 200 which may be used for implementing various aspects of the present invention in accordance with a specific embodiment.

FIG. 2 shows a block diagram of various components and systems of the Kontera Server System 200 which may be used for implementing various aspects of the present invention in accordance with a specific embodiment. As illustrated in the embodiment of FIG. 2, the Front End component 204 includes at least one web server and web server extensions, and is configured or designed to handle requests from client systems 202.

The Analysis Engine 206 may be configured or designed to perform real-time analysis of web page content. As illustrated in the example of FIG. 2, the Analysis Engine 206 may include one or more of the following components: a keywords finder 206a for identifying keywords on selected web pages; a concepts extractor 206b for combining or linking keywords into groups or concepts; a topic finder 206c for identifying topics of a web page based on the identified keywords; an aliases finder 206d for identifying aliases for topics associated with selected web pages; etc.

The Reaction Engine 208 may be configured or designed to utilize information provided by the Analysis Engine 206 to generate real-time web page modification instructions to be implemented by the client system when rendering web page information. According to a specific embodiment, the web page modification instructions may include instructions relating to the insertion of textual markup objects and/or dynamic content for selected web pages being displayed on the client system. As illustrated in the example of FIG. 2, the Reaction Engine 208 may include one or more of the following components: an intrasite links finder 208a for identifying links between web pages of the same web site and/or between web pages from different web sites; a filter 208b for filtering advertisements based upon predetermined criteria (such as, for example, publisher preferences); a cache 208c for storing information relating to previous analysis of web pages; a personalization engine 208d for selecting or determining recommended web page modification instructions based upon selected user profile information (e.g., user click behavior, Geolocation, etc.).

The Tracking Engine 228 may be configured or designed to include redirect and tracking functionality. For example, the shown in FIG. 2, the Tracking Engine 228 may include: a redirect component 228a for redirecting clients to a specified destination, the tracking component 228b for tracking and storing information relating to user clicks and impressions.

Other components of the Kontera Server System 200 may include: a chunk parser 212 (such as, for example, a part-of-speech text processor) for parsing chunks of received web page content and/or for performing analyses of the text syntax; a Middle Tier component 210 configured or designed to include data warehouse and business logic functionality; at least one database 230 for storing information such as, for example, web page analysis information, application data, reports, taxonomy information, ontology information, etc.; a report manager 222 for collecting and storing reports and other information from different components in the Kontera Server System; a connectors component 216 configured or designed to provide a connection point for external data; a translation engine 224 for translating or converting communications from one format type to another format type (e.g., from XML to HTML or vice versa); a parsing engine for parsing HTML into readable text; and a management console 214 which provides a user interface for creating and viewing reports, setting system configurations and parameters, etc. According to a specific embodiment, the management console 214 may be configured or designed to allow content providers and/or advertisers to access the Kontera Server System in order to: access desired information stored at the Kontera Server System (e.g., keyword taxonomy information, content provider information, advertiser information, etc.); manage and generate desired reports; manage information relating to one or more ad campaigns; etc. It will be appreciated that alternate embodiments of the Kontera Server System of the present invention may include additional or fewer components than those illustrated in FIG. 2.

Figure 3:
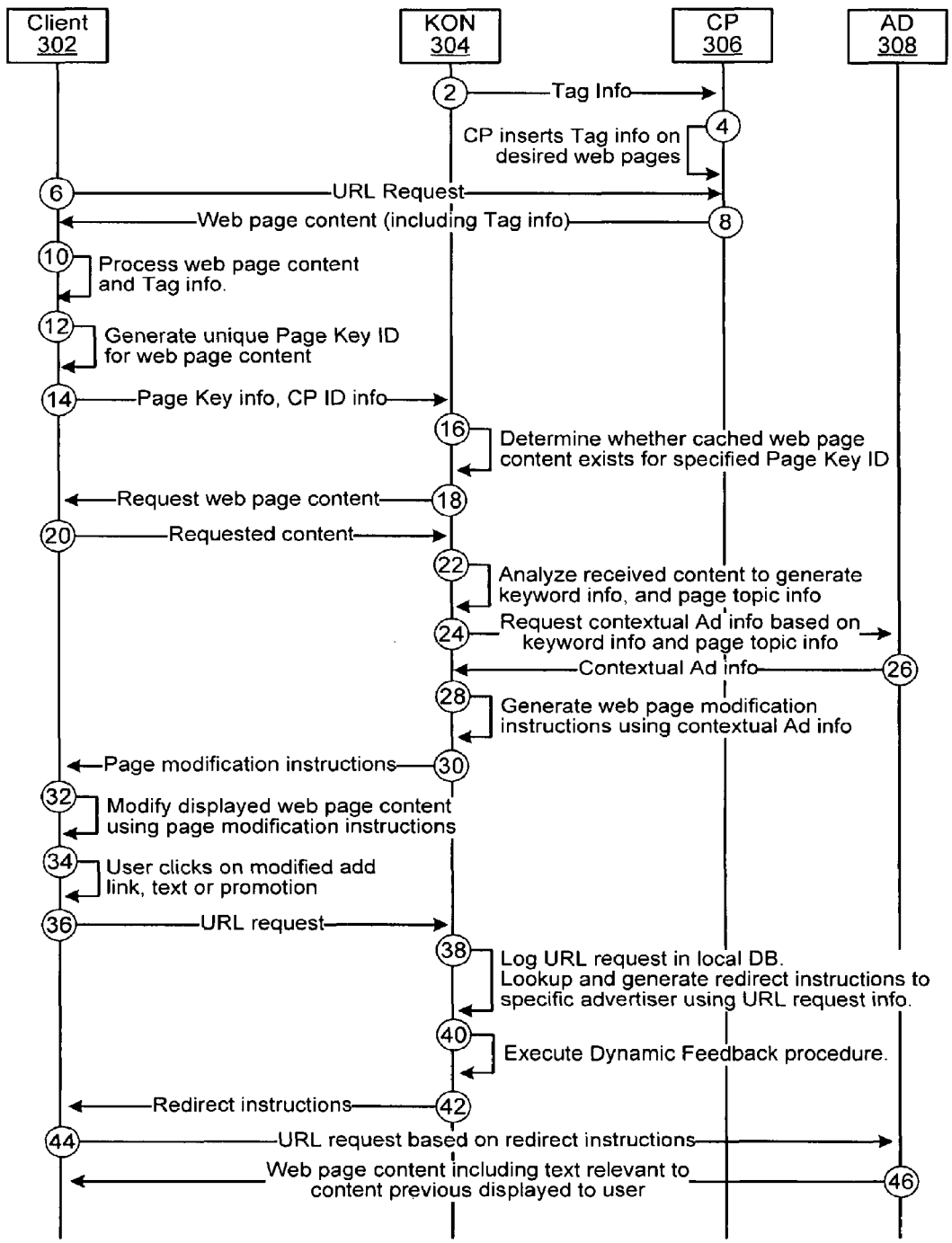
FIG. 3 shows a flow diagram illustrating various information flows and processes of the present invention which may occur at various systems in accordance with a specific embodiment.

FIG. 3 shows a flow diagram illustrating various information flows and processes of the present invention which may occur at various systems in accordance with a specific embodiment. According to a specific implementation, in order for a content provider (such as, for example, on-line publishers or other website operators providing on-line content) to utilize the real-time contextual advertising features of the present invention, the content provider will first obtain a unique content provider ID. In one implementation, the unique content provider ID may be assigned by the Kontera Server System. In a specific embodiment, the unique content provider ID information may be embedded into a dynamic context tag (such as, for example, a Java script tag) which may then be inserted into the content provider's web pages. Thus, for example, as illustrated in FIG. 3, the Kontera Server System (KON) 304 provides (2) dynamic context tag information which includes the unique content provider ID to the content provider server (CP) 306. In at least one implementation, the content provider may utilize the dynamic context tag information to generate one or more dynamic context tags to be inserted (4) on selected web pages which the content provider has identified for utilizing the real-time contextual advertising features of the present invention. According to a specific embodiment, each dynamic context tag may include information relating to the content provider ID, and may also include information relating to one or more desire to add types (e.g., TextMatch, AdMatch, Pop-up, AdLink, NaviLink, etc.) for the corresponding web page. In one embodiment, the dynamic context tag may be physically inserted into each of the selected web pages. Alternatively, the dynamic context tag information may be inserted into the page via a tag that is already all the page such as, for example, and ad server tag or an application server tag. Once present on the page, the dynamic context tag will be served as part of the page that is served from the content provider's web server(s).

For example, as shown in FIG. 3, it is assumed at (6) that a user at the client system 302 has initiated a URL request to view a particular web page such as, for example, www.yahoo.com. Such a request may be initiated, for example, via the Internet using an Internet browser application at the client system. When the URL request is received at the content provider server 306, the server responds by transmitting or serving (8) web page content, including the dynamic context tag, to the client system 302. The client system will then process (10) the received web page content including the dynamic context tag, which includes dynamic context tag information relating to the content provider ID and desired ad types for the retrieved web page. According to a specific embodiment, the processing of the dynamic context tag information will invoke a Java script operation which causes the client system to generate (10) a unique page key ID for the received web page content, and to transmit (12) the page key ID information, desired ad type information, and content provider ID information to the Kontera Server System 304. In at least one embodiment, a page key ID represents a unique identifier for a specific web page, and may be generated based upon text, structure and/or other content of that web page. In a specific implementation, the page key ID is not based upon the identity of the user, client system, or content provider. However, the page key ID may be used to uniquely identify personalized web pages, customized web pages, and dynamically generated web pages.

Upon receiving the page key ID information and content provider ID information, the Kontera Server System uses this information to determine (16) whether a cached version of the web page corresponding to the page key ID already exists within the Kontera Server System cache. According to a specific embodiment, if it is determined that a cached version of the web page exists at the Kontera Server System, then flow may commence starting at operation (24) of FIG. 3, which is described in greater detail below. However, for purposes of illustration, it is assumed that a cached version of the web page does not exist at the Kontera Server System. Accordingly, the Kontera Server System request (18) the client system to provide at least a portion of the web page content. The client system responds by transmitting (20) the requested web page content to the Kontera Server System. In the specific implementation, the requested content may be transmitted to the Kontera Server System in chunks which may span the one or more sessions.

As the Kontera Server System receives the web page content from the client system, it analyzes (22), in real-time, the received web page content in order to generate keyword information and page topic information. Specific embodiments of the web page content analysis procedure are described in greater detail below with reference to FIGS. 5-7 of the drawings. According to a specific implementation, the keyword information may include, for example, taxonomy keywords, ontology (or "Adlink") keywords, keyword ranking information, primary keyword information, etc. The page topic information may include one or more page topics associated with the web page currently being analyzed. In at least one embodiment, taxonomy keywords may correspond to words or phrases in the web page content which relate to the topic or subject matter of the web page. Ontology or Adlink keywords may correspond to words or phrases in the web page content which may have advertising value. In some cases, it is possible for a word or phrase to be classified as both a taxonomy keyword and an Adlink keyword.

In at least one implementation, the Kontera Server System may continue to request and analyze web page content for the specified web page until it has generated a sufficient amount of keyword information (e.g., 5 or more taxonomy keywords and 5 or more ontology keywords), until it has generated a sufficient amount of page topic information, and/or until the entirety of the web page content has been analyzed. Once the Kontera Server System has finished performing its analysis of the web page content, it may then submit a request (24) to one or more advertiser systems 308 for contextual ad information relating to the identified keyword information and page topic information. Each advertiser system may, in turn, process the ad information request in order to determine if it has relevant advertising information relating to the specified keyword information and page topic information. If so, the advertiser system 308 may transmit (26) contextual ad information to the Kontera Server System. In at least one embodiment, the contextual ad information may include a variety of different information such as, for example, text, images, HTML, scripts, video, audio, proprietary rich media, etc. In addition, the contextual ad information also include URL information and financial information such as, for example, cost per click (CPC) information. An example of this is illustrated in FIG. 13 of the drawings.

FIG. 13 shows an example of a contextual ad information record 1300 in accordance with a specific embodiment of the present invention. As shown in FIG. 13, ad information record 1300 may include a plurality of different fields such as, for example, a title field 1302 which may include title information relating to the ad, a description field 1304 which may include content relating to the ad, a click URL field 1308 which includes a "click" URL that is to be accessed when the user clicks on the ad, a landing URL field 1306 which includes a "landing" URL where the user will eventually be redirected to after the click URL action has been processed, a cost-per-click (CPC) information field 1312 which may include cost-per-click information relating to one or more monetary values which the advertiser will pay for each user click on the ad.

According to a specific embodiment, it is possible for the Kontera Server System 304 to receive different contextual ad information from a plurality of different advertiser systems. In one implementation, the received ad information may be sorted and/or ranked according to predetermined criteria (such as, for example, CPC criteria, revenue criteria, expected return criteria, type of ad, likelihood of user clicks, statistical historical data, etc.) in order to select the desired ad to be used.

Returning to FIG. 3, once a desired ad has been selected, the Kontera Server System may then generate (28) web page modification instructions using, for example, the contextual ad information associated with the selected ad, and the desired ad type information specified by the content provider. An example of a specific embodiment of web page modification instructions procedure is described in greater detail below with respect to FIG. 8 of the drawings. According to a specific embodiment, the web page modification instructions may include keyword impression information which may be logged at the Kontera Server System database.

Once the web page modification instructions have been generated, they are transmitted (30) to the client system. In a specific embodiment, the web page modification instructions may be implemented using a scripting language such as, for example, Java script. When the web page modification instructions are received at the client system, the client system processes the instructions, and in response, modifies (32) the display of the web page content in accordance with the page modification instructions.

According to at least one embodiment, the web page modification instructions may include instructions for modifying, in real-time, the display of web page content on the client system by inserting and/or modifying textual markup information and/or dynamic content information. Because the web page modification operations are implemented automatically, in real-time, and without significant delay, such modifications may be performed transparently to the user. Thus, for example, using the technique of the present invention, when the user submits a URL request at the client system to view a web page (such www.yahoo.com, for example), the client system will receive web page content from www.yahoo.com, and will also receive web page modification instructions from the Kontera Server System. The client system will then render the web page content to be displayed in accordance with the received web page modification instructions.

Figure 10A:
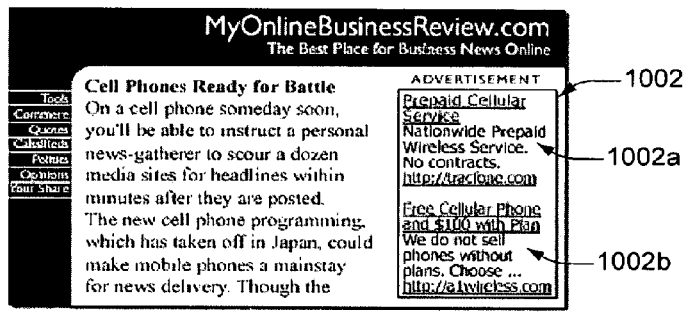
FIGS. 10A-E provide examples of various screen shots which illustrate different techniques which may be used for modifying web page displays in order to present additional contextual advertising information.
Figure 10B:
Figure 10C:
Figure 10D:
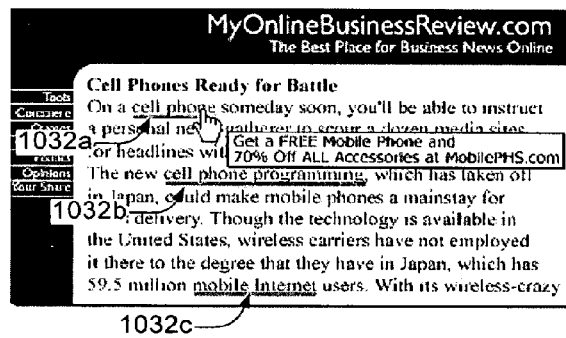
Figure 10E:
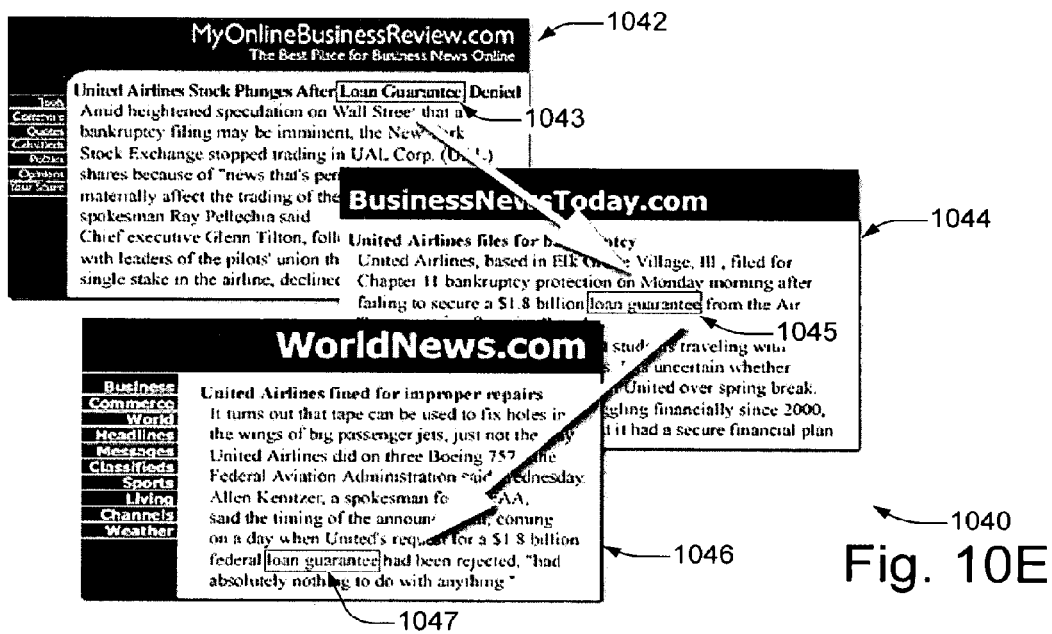

FIGS. 10A-E provide examples of various screen shots which illustrate different techniques which may be used for modifying web page displays in order to present additional contextual advertising information. FIG. 10A illustrates a technique (herein referred to as "TextMatch") for placing additional relevant search listings (1002*a*, 1002*b*) or search results next to the relevant web page content. FIG. 10B illustrates a technique (herein referred to as "AdMatch") for placing relevant marketing opportunities, promotions, graphics, commerce opportunities, ads (1012), etc. next to the web page content. FIG. 10C illustrates a technique (herein referred to as "Contextual Pop-ups") for placing relevant pop-up windows (1022) on top or under the current page. The pop-up window(s) may include information relating to content, marketing opportunities, promotions, graphics, commerce opportunities, etc. FIG. 10D illustrates a technique (herein referred to as "AdLinks") for placing additional links to information (1034) (e.g., content, marketing opportunities, promotions, graphics, commerce opportunities, etc.) within the existing text of the web page content by transforming existing text (1032a, 1032b) into hyperlinks. FIG. 10E illustrates a technique (herein referred to as "NaviLinks") for finding web pages (1042, 1044, 1046) that relate to each other (e.g., by relevant topic or theme), finding relevant keywords (1043, 1045, 1047) on those pages, and then transforming those relevant keywords into hyperlinks that link between the related pages.

Returning to FIG. 3, at (34) it is assumed that the user has clicked on one of the contextual ads which was dynamically inserted into the web page content using the above-described technique. According to at least one embodiment, the action of the user clicking on one of the contextual ads causes the client system to transmit (36) a URL request to the Kontera Server System. The URL request may be logged (38) in a local database at the Kontera Server System when received. The URL may include embedded information allowing the Kontera Server System to identify various information about the selected ad, including, for example, the identity of the sponsoring advertiser, the keywords(s) associated with the ad, the ad type, etc. The Kontera Server System 304 may use at least a portion of this information to generate (38) redirected instructions for redirecting the client system to the identified advertiser. Additionally, the Kontera Server System may also use at least a portion of the URL information during execution (40) of a Dynamic Feedback Procedure such as that illustrated, for example, in FIG. 9 of the drawings. In at least one embodiment, the Dynamic Feedback Procedure may be implemented to record user click information and impression information associated with various keywords.

As shown at (42), the Kontera Server System transmits the redirected instructions to the client system 302. In response, the client system is redirected to transmit (44) a new URL request to Ad Server 308. The Ad Server may then respond by serving (46) web page content corresponding to the URL request to the client system 302. In at least one embodiment, the web page content sent from the ad Server 308 may include text or other information relevant to content of the web page previously displayed to the user.

Figure 4:
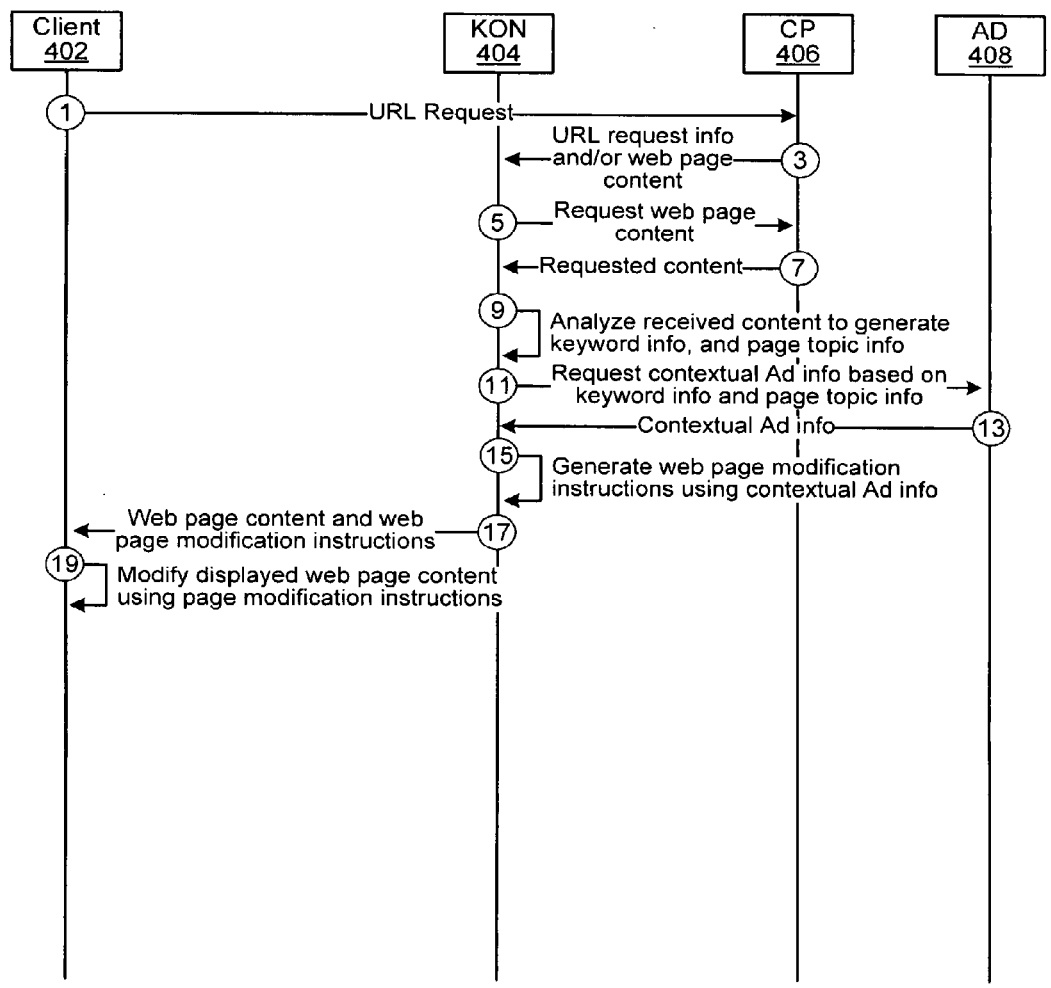
FIG. 4 shows a flow diagram of an alternate embodiment for implementing the contextual analysis and content modification techniques of the present invention.

FIG. 4 shows a flow diagram of an alternate embodiment for implementing the contextual analysis and content modification techniques of the present invention. As explained in greater detail below, the contextual analysis and content modification techniques of FIG. 4 may be implemented without the need for the content provider to modify its web pages to include dynamic context tag information such as that described previously with respect to FIG. 3.

In the example of FIG. 4, it is assumed at (1) that a user at the client system 402 has initiated a URL request to view a particular web page such as, for example, www.yahoo.com. Such a request may be initiated, for example, via the Internet using an Internet browser application at the client system. When the URL request is received at the content provider server 406, server 406 responds by transmitting (3) the URL request info and/or web page content (corresponding to the requested URL) to the Kontera Server System 404. In a specific embodiment where the Kontera Server System receives only the URL request information from the content provider server, the Kontera Server System may request (5) the web page content (corresponding to the requested URL) from the content provider server 406. The server 406 made and respondent by providing the requested web page content to the Kontera Server System.

As the Kontera Server System 404 receives the web page content from the content provider server 406, it analyzes (9), in real-time, the received web page content in order to generate keyword information and page topic information. In at least one implementation, the Kontera Server System may continue to request and analyze web page content for the specified web page until it has generated a sufficient amount of keyword information until it has generated a sufficient amount of page topic information, and/or until the entirety of the web page content has been analyzed. Once the Kontera Server System has finished performing its analysis of the web page content, it may then submit a request (11) to one or more advertiser systems 408 for contextual ad information relating to the identified keyword information and page topic information. Each advertiser system may, in turn, process the ad information request in order to determine if it has relevant advertising information relating to the specified keyword information and page topic information. If so, the advertiser system 408 may transmit (13) contextual ad information to the Kontera Server System.

According to a specific embodiment, it is possible for the Kontera Server System 404 to receive different contextual ad information from a plurality of different advertiser systems. In one implementation, the received ad information may be sorted and/or ranked according to predetermined criteria in order to select a desired ad. Once a desired ad has been selected, the Kontera Server System may then generate (15) web page modification instructions using, for example, the contextual ad information associated with the selected ad, and desired ad type information specified by the content provider server 406. The web page content and web page modification instructions are then transmitted (17) to the client system. When the web page content and web page modification instructions are received at the client system, the client system processes the instructions, and in response, modifies (19) the web page content in accordance with the web page modification instructions. In an alternate embodiment (not shown), the Kontera Server System may perform the task of modifying the web page content in accordance with the web page modification instructions before sending the modified information to the client system 402. Accordingly, in this embodiment the client system may receive the modified web page content (which now includes the contextual ad information) from the Kontera Server System.

Because the web page modification operations are implemented automatically, in real-time, and without significant delay, such modifications may be performed transparently to the user. Thus, for example, from the user's perspective, when the user requests a particular web page to be retrieved and displayed on the client system, the client system will respondent by displaying a modified web page which not only includes the original web page content, but also includes additional contextual ad information. If the user subsequently clicks on one of the contextual ads which was dynamically inserted into the web page content (a shown, for example, at operation 34 of FIG. 3), process flow may commence in a manner similar to that described previously with respect to operations (34)-(46) of FIG. 3.

Figure 5:
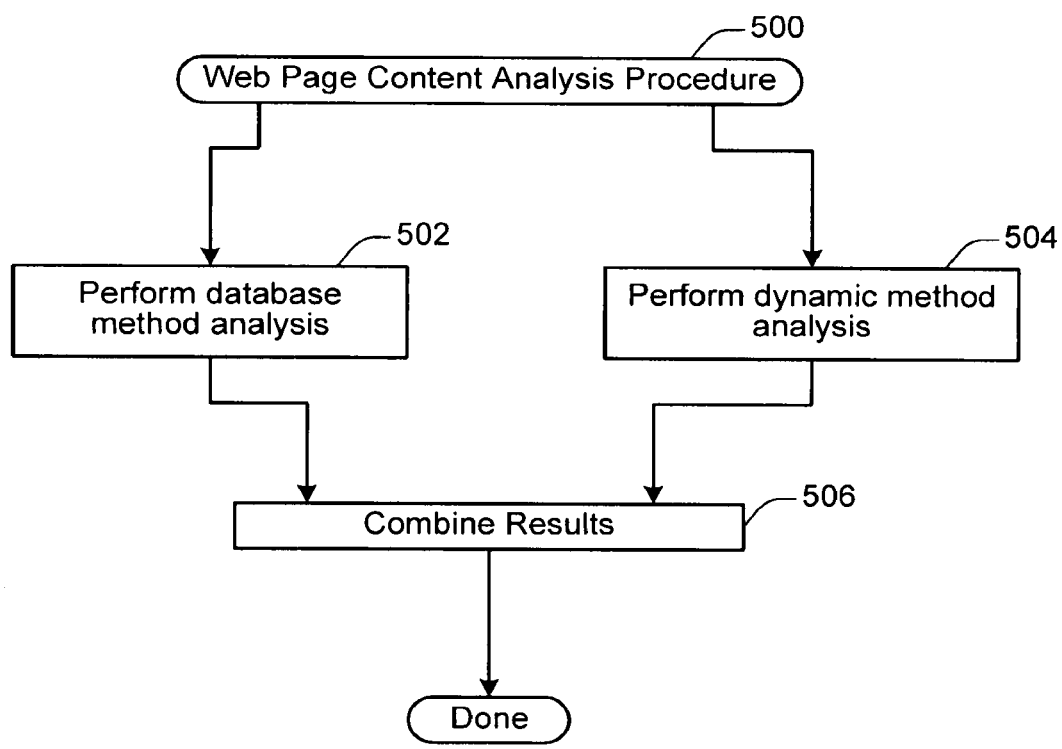
FIG. 5 shows a flow diagram of a Web Page Content Analysis Procedure 500 and accordance with a specific embodiment of the present invention.

FIG. 5 shows a flow diagram of a Web Page Content Analysis Procedure 500 and accordance with a specific embodiment of the present invention. In at least one embodiment, the Web Page Content Analysis Procedure 500 may be implemented at the Kontera Server System for analyzing received web page content in order to generate keyword information and page topic information, as described previously, for example, with respect to FIGS. 3 and 4. As illustrated in the embodiment of FIG. 5, when a portion of web page content is presented to the Kontera Server System for analysis, the Kontera Server System may respond by performing (502) a database method analysis of the received web page content, and by also performing (504) a dynamic method analysis of the received web page content. The results from the database method analysis and dynamic method analysis may then be combined (506) in order to generate desired keyword information and page topic information.

Figure 6:
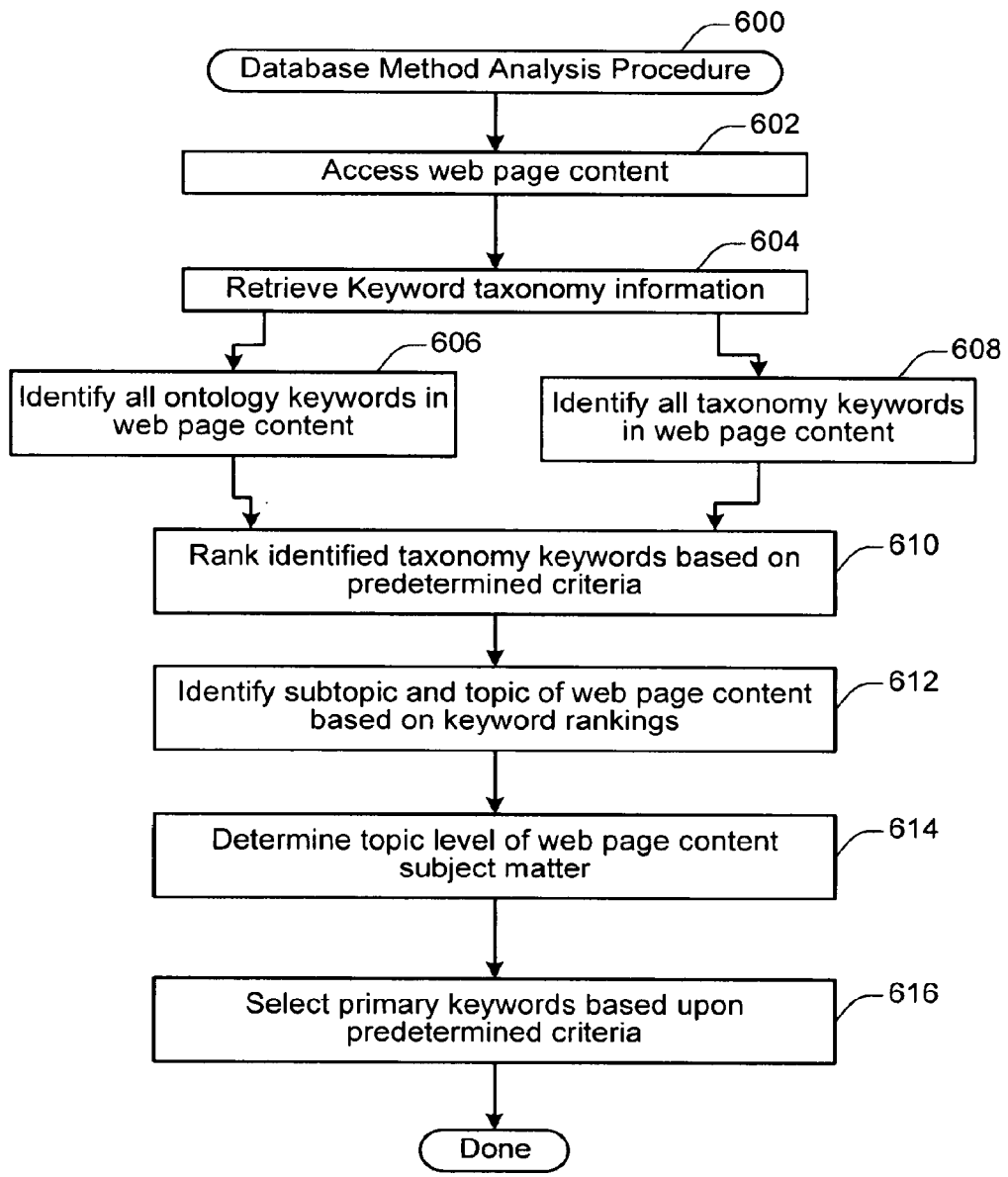
FIG. 6 shows a flow diagram of a Database Method Analysis Procedure 600 in accordance with a specific embodiment of the present invention.

FIG. 6 shows a flow diagram of a Database Method Analysis Procedure 600 in accordance with a specific embodiment of the present invention. According to at least one embodiment, the Database Method Analysis Procedure 600 may be implemented during execution of the Web Page Content Analysis Procedure 500 of FIG. 5. In a specific implementation, the Database Method Analysis Procedure may be configured to utilize taxonomy keyword information when analyzing web page content in order to identify taxonomy keywords and/or ontology keywords. The Database Method Analysis Procedure may also be configured to utilize the identified keyword information in order to generate other information such as, for example, primary keyword information, topic information (e.g., which relates to the topic of the web page content), etc. An example of the keyword/topic classification scheme as illustrated in FIG. 14 of the drawings.

Figure 14:
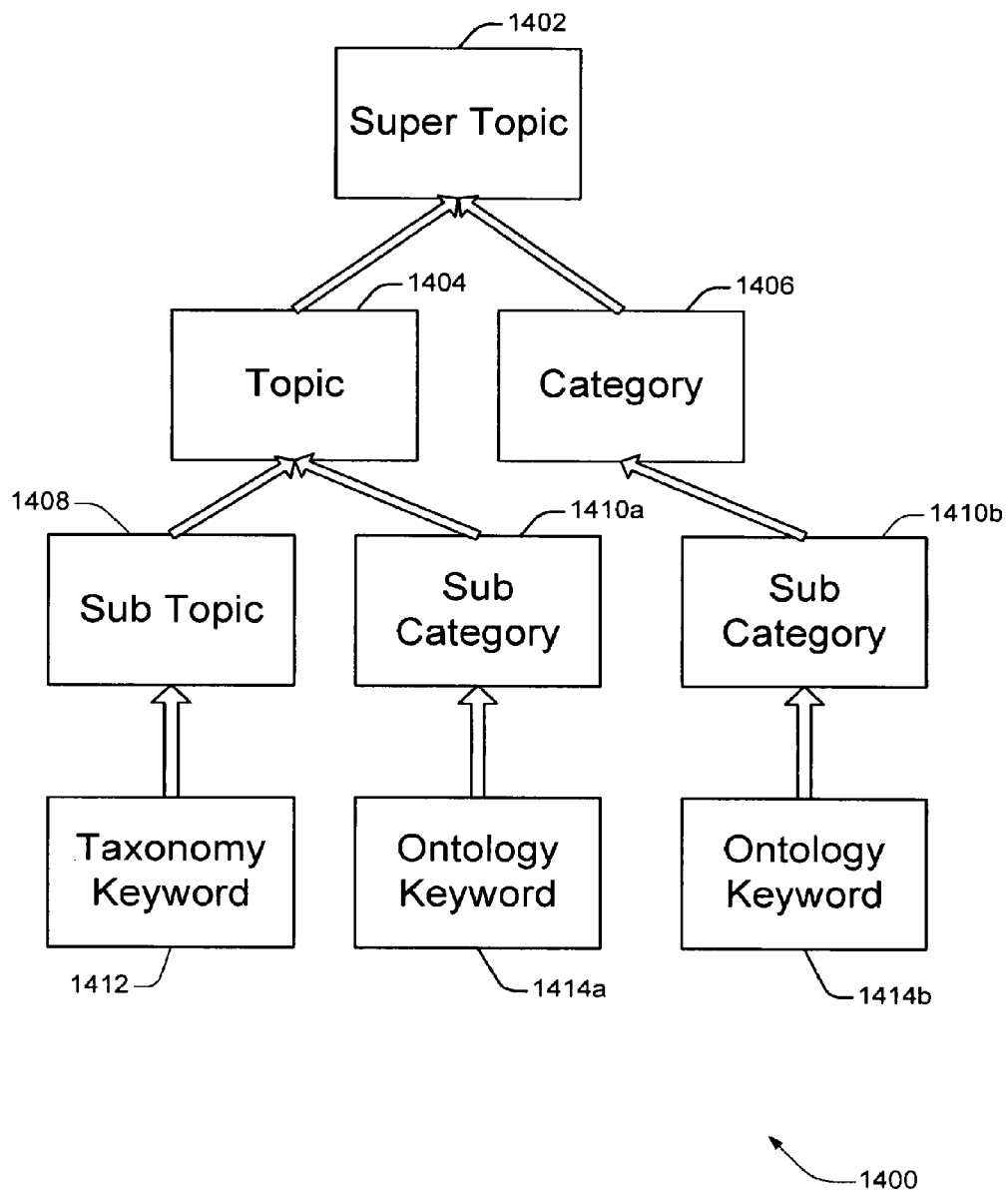
FIG. 14 shows an example of a keyword/topic classification scheme 1400 in accordance with a specific embodiment of the present invention.

FIG. 14 shows an example of a keyword/topic classification scheme 1400 in accordance with a specific embodiment of the present invention. As illustrated in the example of FIG. 14, the keyword/topic classification scheme may include a plurality of hierarchical classifications (e.g., keywords, sub-topics, subcategories, topics, categories, super topics, etc.). The highest level of the hierarchy corresponds to super topic information 1402. In one implementation, the super topic may correspond to a general topic or subject matter such as, for example, "sports". The next level in the hierarchy includes topic information 1404 and category information 1406. In one implementation, topic information may correspond to subsets of the super topic which may be appropriate for contextual content analysis. For example, "basketball" is an example of a topic of the super topic "sports". Category information, on the other hand, may correspond to subsets of the super topic which may be appropriate for advertising purposes, but which may not be appropriate for contextual content analysis. For example, "sports equipment" is an example of a category of the super topic "sports".

The next level in the hierarchy includes sub-topic information 1408 and sub-category information 1410a, 1410b. In one implementation, sub-topic information may correspond to subsets of topics which may be appropriate for contextual content analysis. For example, "NBA" is an example of a sub-topic associated with the topic "basketball". Sub-category information may correspond to subsets of topics and/or categories which may be appropriate for advertising purposes, but which may not be appropriate for contextual content analysis. For example, "NBA merchandise" is an example of a sub-category of topic "basketball", and "foosball" is an example of a sub-category associated with the category "sports equipment". The lowest level of the hierarchy corresponds to keyword information, which may include taxonomy keywords 1412, ontology keywords 1414a, 1414b, and/or keywords which may be classified as both taxonomy and ontology. In at least one embodiment, taxonomy keywords may correspond to words or phrases in the web page content which relate to the topic or subject matter of a web page. Ontology (or "Adlink") keywords may correspond to words or phrases in the web page content which are not to be included in the contextual content analysis but which may have advertising value. For example, "LA Lakers" is an example of a taxonomy keyword of sub-topic "NBA", "Air Jordan" is an example of an ontology keyword associated with the sub-category "NBA merchandise", and "foosball table" is an example of an ontology keyword associated with the sub-category "foosball".

Returning to the example of FIG. 6, it is assumed that the Database Method Analysis Procedure 600 has been called to analyze a portion of web page content which, for example, has been received at the Kontera Server System. Accordingly, as shown at (602), the web page content to be analyzed is accessed. Additionally, as shown at (604), keyword taxonomy information is retrieved. In a specific implementation, the keyword taxonomy information may include a keyword taxonomy file which is stored in a database at the Kontera Server System. The keyword taxonomy file may include a plurality of taxonomy keywords and/or ontology keywords. In one implementation, each record in the keyword taxonomy file may use a format similar to that shown, for example, in FIG. 12 of the drawings.

As the Database Method Analysis Procedure performs its analysis, it compares the web page content to information in the keyword taxonomy information in order to identify (606) all ontology keywords in the web page content, and to identify (608) all taxonomy keywords in the web page content. After identifying the ontology and taxonomy keywords, the Database Method Analysis Procedure ranks (610) the identified taxonomy keywords based upon predetermined criteria. According to different implementations, the ranking of an identified taxonomy keyword may be based on a variety of different criteria such as, for example, its location on the web page, its relative location in the keyword taxonomy file, frequency of occurrence on the web page, its formatting properties, its proximity to other words, its previous performance indicators (e.g., clicks/impressions), pricing information, etc. For example, according to a specific implementation, different pricing information (e.g., average price (CPC) per keyword and/or topic) may be associated with different keywords and/or topics. Such pricing information may be used as criteria for ranking various keywords. For example, higher priced keywords may receive a relatively higher ranking score. This feature provides the benefit of facilitating elevation of revenue numbers for server-side clients such as content providers and/or advertisers.

After the identified taxonomy keywords have been ranked, the Database Method Analysis Procedure may then identify (612) appropriate sub-topic, topic and/or super topic classifications of the web page content based upon the keyword rankings. Using this information, the Database Method Analysis Procedure may then determine (614) the appropriate topic level (e.g., sub-topic, topic, or super topic) of the overall web page content subject matter. In at least one embodiment, it is possible for multiple topics and/or sub-topics to be assigned to a given web page. In this way, each topic and/or sub-topic assigned to the web page may be evaluated independently for performance purposes.

Figure 7:
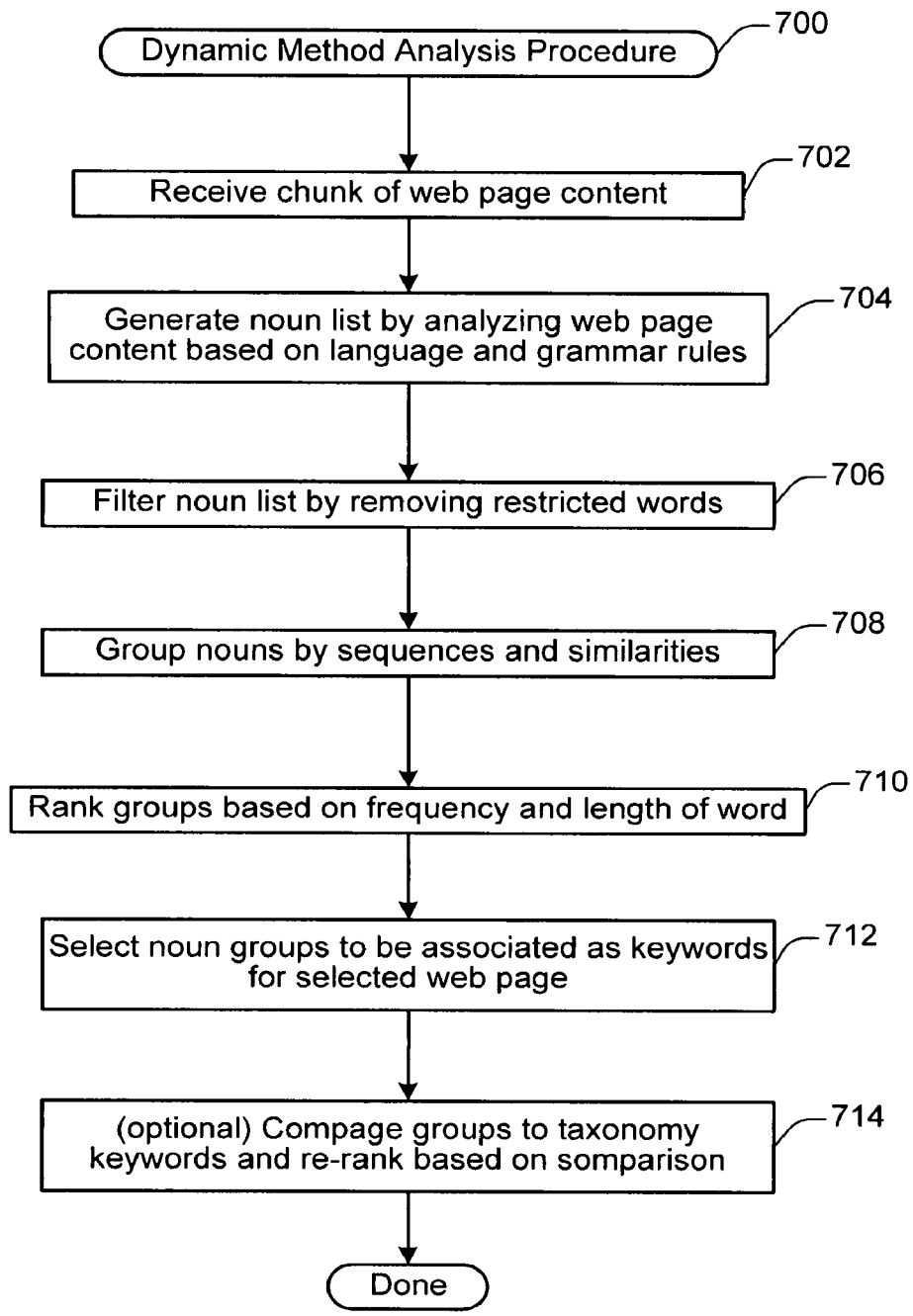
FIG. 7 shows a flow diagram of a Dynamic Method Analysis Procedure 700 in accordance with a specific embodiment of the present invention.

FIG. 7 shows a flow diagram of a Dynamic Method Analysis Procedure 700 in accordance with a specific embodiment of the present invention. According to at least one embodiment, the Dynamic Method Analysis Procedure 700 may be implemented during execution of the Web Page Content Analysis Procedure 500 of FIG. 5. In a specific implementation, the Dynamic Method Analysis Procedure may be configured to dynamically identify keywords in web page content without relying upon the keyword taxonomy information during the analysis.

In the example of FIG. 7, it is assumed that the Dynamic Method Analysis Procedure 700 has been called to analyze a portion of web page content which, for example, has been received at the Kontera Server System. Upon receiving (702) a chunk or portion of the web of a content, the Dynamic Method Analysis Procedure generates (704) a noun list of potential keywords by analyzing the web page content using language and/or grammar rules. In one implementation, the noun list may include nouns, proper nouns, and/or noun phrases which have been identified in the web page content. According to a specific embodiment, such a noun list may be generated, for example, by identifying the parts of speech of the words and/or phrases in the web page content, and then the selecting the identified nouns, proper nouns, and/or noun phrases. According to different embodiments, a variety of different techniques may be used for identifying the parts of speech of the words and/or phrases in the web page content. An example of such a technique is via the use of a part-of-speech processing algorithm such as the NLProcessor Engine, available from Infogistics Ltd. of Edinburgh, Scotland (www.infogistics.com).

After the noun list has been generated, it may be filtered (706), for example, by removing restricted or undesirable words. The noun list information may then be grouped (708) according to desired criteria such as, for example, by sequences and/or similarities. The different noun groups may then be ranked (710) according to desired criteria such as, for example, frequency, length of word, etc. as shown at (712) at least a portion of the different noun groups may be selected to be associated as keywords for selected web page. In a specific implementation, the selected noun groups may correspond to those groups which have a corresponding match to keywords in the keyword taxonomy, and also which are associated with the page topic(s) identified for the selected web page. According to a specific implementation, the ranked noun groups may (optionally) be compared (714) to the keyword taxonomy information, and then re-ranked based on the comparison. For example, noun groups which have a corresponding match to keywords in the keyword taxonomy may receive an increase in their relative ranked value.

Figure 8:
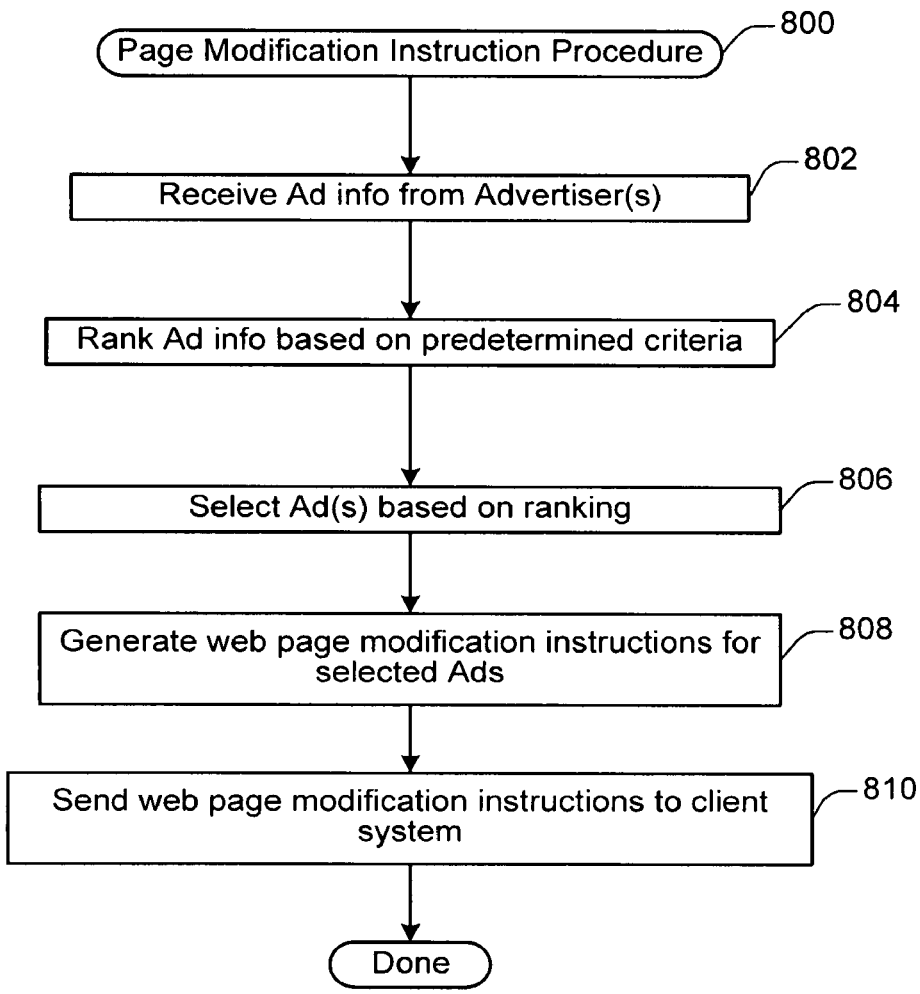
FIG. 8 shows a flow diagram of a Page Modification Instruction Procedure 800 in accordance with a specific embodiment of the present invention.

It will be appreciated that one advantage of the Dynamic Method Analysis Procedure is that it may be used to generate a plurality of new and/or additional keywords which are not presently included in the keyword taxonomy database. This feature provides the additional benefit of allowing the use of a smaller keyword taxonomy file to dynamically generate a desired amount of identified keywords during the web page content analysis. It also enables the identification of new products, company names, etc. that were not previously added into the keyword taxonomy database. FIG. 8 shows a flow diagram of a Page Modification Instruction Procedure 800 in accordance with a specific embodiment of the present invention. In at least one embodiment, the Page Modification Instruction Procedure may be implemented at the Kontera Server System for generating web page content modification instructions using contextual ad information, as described previously, for example, with respect to FIGS. 3 and 4. In the example of FIG. 8, it is assumed that the Kontera Server System has submitted a request to one or more advertiser systems for contextual ad information relating to specific keyword information and page topic information. It is further assumed that one or more advertiser systems have responded to the request by transmitting their respective ad information to the Kontera Server System. When the ad information is received (802) from the advertisers, the ad information may be ranked (804) based upon predetermined criteria such as, for example, CPC criteria, revenue criteria, expected return criteria, likelihood of user clicks, statistical historical data, etc. One or more ads may then be selected (806) (depending upon the number of ads desired) based upon their relative ranking.

Once the desired ad(s) have been selected, the Page Modification Instruction Procedure may then generate (808) web page modification instructions using, for example, the contextual ad information associated with the selected ad, and the desired ad type information specified by the content provider. According to at least one embodiment, the web page modification instructions may include instructions for modifying, in real-time, the display of web page content on the client system by inserting and/or modifying textual markup information and/or dynamic content information. Additionally, the web page modification instructions may include keyword impression information which may be stored at the Kontera Server System database. Once generated, the web page modification instructions may then be transmitted (810) to the client system for implementation. In a specific embodiment, the web page modification instructions may be implemented using a scripting language such as, for example, Java script. When the web page modification instructions are received at the client system, the client system processes the instructions, and in response, modifies the display of the web page content in accordance with the page modification instructions.

Figure 9:
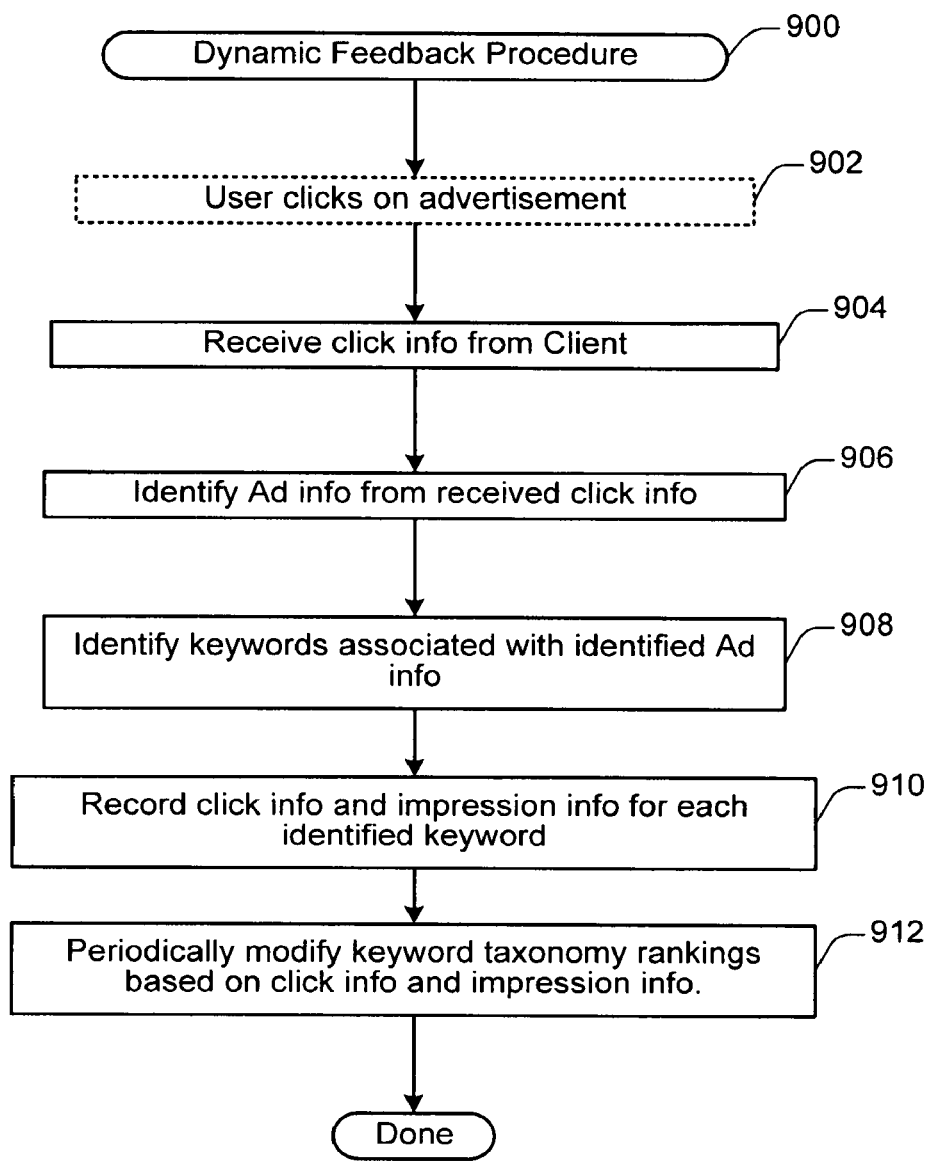
FIG. 9 shows a flow diagram of a Dynamic Feedback Procedure 900 in accordance with the specific embodiment of the present invention.

FIG. 9 shows a flow diagram of a Dynamic Feedback Procedure 900 in accordance with the specific embodiment of the present invention. In at least one embodiment, the Dynamic Feedback Procedure may be implemented at the Kontera Server System to record user click information and impression information associated with various keywords, as described previously, for example, with respect to FIG. 3. In the example of FIG. 9, it is assumed that (902) that the user has click on a contextual advertisement displayed on the client system. The action of the user clicking on one of the contextual ads causes the client system to transmit the user click information to the Kontera Server System by way of a URL request. The URL request may include embedded information allowing the Kontera Server System to identify various information about the ad, including, for example, the identity of the sponsoring advertiser, the keywords(s) associated with the ad, the ad type, etc. When the Dynamic Feedback Procedure receives (904) the click information, it identifies (906) the ad information associated with the click information, and identifies (908) the keywords associated with the identified ad information. The user click information and impression information for each of the identified keywords may then be recorded (910). In one implementation, the user click information and impression information is recorded on a local database at the Kontera Server System. Additionally, in at least one implementation, information relating to the keyword impression information may be accessed from a database at the Kontera Server System. As shown at (912) the rankings of keywords in the keyword taxonomy database may be periodically modified based upon specific criteria such as, for example, the user click information and impression information associated with each keyword.

FIG. 11 shows an example of a dynamic feedback database record 1100 in accordance with a specific embodiment of the present invention. In at least one embodiment, the Dynamic Feedback Procedure may store user click information and impression information for selected keywords using the dynamic feedback database record 1100. As illustrated in the embodiment of FIG. 11, the dynamic feedback database record may include a plurality of different fields (1102-1114) for recording various information about a selected keyword. For example, the dynamic feedback database record may include: a keyword ID field 1102 which includes keyword ID information relating to a selected keyword; a text string field 1104 which includes information relating to the keyword text string; a total clicks field 1106 which includes information relating to a cumulative or total amount of user clicks for that particular keyword (e.g., total clicks for a specific page, total clicks across pages that were part of a specific topic (super topic, topic, sub topic), etc.); a total impressions field 1108 which includes information relating to a cumulative or total amount of impressions for that particular keyword; an impression type field 1112 which includes information relating to the type(s) of impression(s) (e.g., Adlink, pop-up, Navilink, SerchMatch, AdMatch, etc.) used to display that particular keyword; a timestamp information field which includes information relating to the time(s)/date(s) when the user click(s) occurred for that particular keyword, etc.

FIG. 12 shows an example of a keyword taxonomy database record 1200 in accordance with a specific embodiment of the present invention. According to at least one embodiment, the keyword taxonomy database record may include a plurality of different fields (1202-1220) for recording various information about a selected keyword. For example, the keyword taxonomy database record may include: a keyword ID field 1202 which includes keyword ID information relating to a selected keyword; a text string field 1204 which includes information relating to the keyword text string; a keyword type field 1206 which includes information relating to the keyword type (e.g., taxonomy, ontology, or both); a rank information field 1212 which includes information relating to relative ranking of that keyword within the keyword taxonomy database; a super topic ID field 1214 which includes information relating to at least one super topic associated with that particular keyword; a topic ID field 1216 which includes information relating to at least one topic (if any) associated with that particular keyword; and a topic ID field 1218 which includes information relating to at least one sub-topic (if any) associated with that particular keyword. The keyword taxonomy database record may also include other fields 1220 which may include other information such as, for example, category information (if any), subcategory information (if any), pricing information (e.g., average CPC price for keyword and/or topic), etc.

It will be appreciated that the present invention provides content providers with an efficient and unique technique of presenting desired information to end users while those users are browsing the content providers' web pages. Moreover, the technique of the present invention enables content providers to proactively respond to the contextual content on any given page that their customers/users are currently viewing. According to at least one implementation, the technique of the present invention allows a content provider to present links, advertising information, and/or other special offers or promotions which that are highly relevant to the user at that point in time, based on the context of the web page the user is currently viewing, and without the need for the user to perform any active action. As described previously, the additional information to be displayed to the user may be delivered using a variety of techniques such as, for example, providing direct links to other pages with relevant information; providing links that open layers with link(s) to relevant information on the page that the user is on; providing links that open layers with link(s) to relevant information on the page that the user is on; providing layers that open automatically once the user reaches a given page, and presenting information that is relevant to the context of the page; providing graphic and/or text promotional offers, etc.; providing links that open layers with content that is served from an external (third party content server) location, etc.

Moreover, it will be appreciated that the technique of the present invention provides a contextual-based platform for delivering to an end user in real-time proactive, personalized, contextual information relating to web page content currently being displayed to the user. In addition, the contextual information delivery technique of the present invention may be implemented using a remote server operation without any need to modify content provider server configurations, and without the need for any conducting any crawling, indexing, and/or searching operations prior to the web page being accessed by the user. Furthermore, because the technique of the present invention is able to deliver additional contextual information to the user based upon real-time analysis of web page content currently being viewed by the user, the contextual information delivery technique of the present invention is compatible for use with static web pages, customized web pages, personalized web pages, dynamically generated, web pages, and even with web pages where the web page content is continuously changing over time (such as, for example, news site web pages).

Additional techniques relating to on-line contextual advertising techniques are described in U.S. patent application Ser. No. 09/943,524, entitled "DYNAMIC DOCUMENT CONTEXT MARK-UP TECHNIQUE IMPLEMENTED OVER A COMPUTER NETWORK", filed on Aug. 29, 2001, naming Henkin et al. as inventors. That application is incorporated herein by reference in its entirety for all purposes.

Other Embodiments

Generally, the contextual information delivery techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the contextual information delivery technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. A general architecture for some of these machines will appear from the description given below. In an alternative embodiment, the contextual information delivery technique of this invention may be implemented on a general-purpose network host machine such as a personal computer or workstation. Further, the invention may be at least partially implemented on a card (e.g., an interface card) for a network device or a general-purpose computing device.

Referring now to FIG. 15, a network device 60 suitable for implementing the contextual information delivery techniques of the present invention includes a master central processing unit (CPU) 62, interfaces 68, and a bus 67 (e.g., a PCI bus).

When acting under the control of appropriate software or firmware, the CPU 62 may be responsible for implementing specific functions associated with the functions of a desired network device. For example, when configured as a network server, the CPU 62 may be responsible for analyzing packets, encapsulating packets, forwarding packets to appropriate network devices, analyzing web page content, generating web page modification instructions, etc. The CPU 62 preferably accomplishes all these functions under the control of software including an operating system (e.g. Windows NT), and any appropriate applications software.

CPU 62 may include one or more processors 63 such as a processor from the Motorola or Intel family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 15 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the contextual information delivery techniques described herein. The program instructions may control the operation of an operating system and/or one or more applications, for example. The memory or memories may also be configured to store data structures, keyword taxonomy information, advertisement information, user click and impression information, and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A computer-implemented method comprising:
   at a server, receiving from a client system a unique identifier identifying content of a web page that has been processed at the client system;
   determining that a copy of the content of the web page has not previously been received at the server by confirming that the unique identifier is not associated with a record of a cached version of the web page in a cache accessible to the server;
   after determining that a copy of the content of the web page has not previously been received at the server, communicating a content request to the client system;
   receiving from the client system content of the web page;
   processing the received content of the web page to generate web page modification instructions for use in modifying the web page at the client system; and
   communicating the web page modification instructions to the client system.

2. The computer-implemented method of claim 1, wherein the web page has been received by the client system from a content provider server.

3. The computer-implemented method of claim 1, wherein the web page has been received by the client system from a content provider server in response to a URL request from the client system to the content provider server.

4. The computer-implemented method of claim 1, wherein the web page includes a tag that is associated with the server that receives the unique identifier identifying content of the web page that has been processed at the client system.

5. The computer-implemented method of claim 4, wherein the tag, when processed by the client system, invokes a script operation.

6. The computer-implemented method of claim 5, wherein the script operation is a JavaScript operation.

7. The computer-implemented method of claim 5, wherein the unique identifier is received from the client at the server, at least in part, as a result of script operations invoked by the tag.

8. The computer-implemented method of claim 1, further comprising requesting the one or more portions of the content of the web page from the client system.

9. The computer-implemented method of claim 1, wherein the web page modification instructions, when processed at the client system, are to modify the web page by transforming one or more selections of existing text of the web page to one or more hyperlinks.

10. The computer-implemented method of claim 1, wherein the web page modification instructions, when processed at the client system, are to modify the web page by inserting into the web page an advertisement selected for being contextually relevant to a keyword included in the content of the web page.

11. The computer-implemented method of claim 1, wherein the web page modification instructions, when processed at the client system, are to modify the web page by inserting into the web page an advertisement selected for being contextually relevant to a topic to which the content of the web page relates.

12. The computer-implemented method of claim 1, wherein processing the received content of the web page to generate web page modification instructions for use in modifying the web page at the client system includes:
  analyzing the received content of the web page to identify keyword information including a keyword from the text of the web page, and page topic information, including a topic for the web page; and
  generating web page modification instructions for use in modifying the web page at the client system, the web page modification instructions to modify the web page at the client system by inserting an advertisement selected based on the keyword from the text of the web page and the topic for the web page.

13. The computer-implemented method of claim 12, wherein the web page modification instructions are to modify the web page to display contextual advertisements selected by an advertiser system based on keyword information and page topic information.

14. The computer-implemented method of claim 1, wherein the unique identifier identifying content of the web page is generated at the client system based on an analysis of text, page structure, or other content of the web page.

15. The computer-implemented method of claim 1, wherein receiving from the client system content of the web page includes receiving a chunk of the web page.

16. The computer-implemented method of claim 1, wherein the cache accessible to the server is a cache that stores information, including web page modification instructions, resulting from a previous analysis of content from another copy of the same web page.

17. The computer-implemented method of claim 1, wherein the web page modification instructions contain instructions, which, when processed at the client system, cause the client system to insert or modify textual markup information, resulting in a modification of how the content of the web page is displayed.

18. A server system comprising:
  a front end component and a cache component, the front end component configured to receive from a client system a unique identifier identifying content of a web page that has been processed at the client system, and to communicate a request to the client system and receive from the client system content of the web page when the cache component determines that a copy of the content of the web page has not previously been received and analyzed at the server by confirming that the unique identifier is not associated with a record of a cached version of the web page in a cache accessible to the server; and
  an analysis engine and a reaction engine, the analysis engine configured to analyze received content of the web page and the reaction engine configured to generate web page modification instructions for use in modifying the web page at the client system, the web page modification instructions generated in part based on the analysis, by the analysis engine, of the received content of the web page, wherein the analysis engine and the reaction engine are implemented at least in part with one or more processors and one or more memory devices.

19. A computer-implemented method comprising:
  at a server, receiving from a client system a unique identifier identifying content of a web page that has been processed at the client system;
  determining that a copy of the content of the web page has previously been received at the server and analyzed to identify keyword information and page topic information by confirming that the unique identifier is associated with a record of a cached version of the web page in a cache accessible to the server;
  after determining that a copy of the content of the web page has previously been received at the server and analyzed to identify keyword information and page topic information, identifying web page modification instructions associated with the content of the web page; and
  communicating the web page modification instructions to the client system.

20. The computer-implemented method of claim 19, wherein the web page modification instructions, when processed at the client system, to modify the web page by transforming one or more selections of existing text of the web page to one or more hyperlinks.

21. The computer-implemented method of claim 19, wherein the web page modification instructions, when processed at the client system, are to modify the web page by inserting into the web page an advertisement selected for being contextually relevant to a keyword included in the content of the web page.

22. The computer-implemented method of claim 19, wherein the web page modification instructions are for instructing the client system to modify the web page to display contextual advertising information.

23. The computer-implemented method of claim 19, wherein the unique identifier identifying content of the web page is generated at the client system based on an analysis of text, page structure, or other content of the web page.

24. The computer-implemented method of claim 19, wherein identifying web page modification instructions associated with the content of the web page includes reading the web page modification instructions from a cache accessible to the server, the web page modification instructions a result of a previous analysis of the copy of the content of the web page previously received at the server.

25. The computer-implemented method of claim 19, wherein the cache accessible to the server is a cache that stores information including web page modification instructions resulting from analysis of content from web pages, the information associated with the unique identifier identifying content of the web page.

26. The computer-implemented method of claim 19, wherein the cache accessible to the service stores a copy of previously analyzed content of a web page.

27. A server system comprising:
  a front end component configured to receive from a client system a unique identifier identifying content of a web page that has been processed at the client system; and
  a cache component configured to identify web page modification instructions associated with the content of the web page after determining that a copy of the content of the web page has previously been received and analyzed at the server by confirming that the unique identifier is associated with a record of a cached version of the web page in a cache accessible to the server, the front end component further configured to communicate the web page modification instructions to the client system, wherein the cache component is implemented at least in part with one or more processors and a memory.

* * * * *

UNITED STATES PATENT AND TRADEMARK OFFICE
CERTIFICATE OF CORRECTION

PATENT NO.       : 8,700,588 B2                                 Page 1 of 1
APPLICATION NO.  : 12/910264
DATED            : April 15, 2014
INVENTOR(S)      : Henkin et al.

It is certified that error appears in the above-identified patent and that said Letters Patent is hereby corrected as shown below:

On title page 3, in column 1, References Cited under "Other Publications", line 27, before "U.S.", delete "Application", therefor On title page 4, in column 1, References Cited under "Other Publications", line 3, delete "fled" and insert --filed--, therefor Signed and Sealed this
Sixteenth Day of December, 2014

Michelle K. Lee
*Deputy Director of the United States Patent and Trademark Office*